(12) United States Patent
Hansen

(10) Patent No.: US 8,108,543 B2
(45) Date of Patent: Jan. 31, 2012

(54) RETRIEVING DATA FROM A SERVER

(75) Inventor: James R. Hansen, Franklin, MA (US)

(73) Assignee: Axeda Corporation, Foxboro, MA (US)

( * ) Notice: Subject to any disclaimer, the term of this patent is extended or adjusted under 35 U.S.C. 154(b) by 983 days.

(21) Appl. No.: 10/124,181

(22) Filed: Apr. 17, 2002

(65) Prior Publication Data

US 2002/0116550 A1    Aug. 22, 2002

Related U.S. Application Data

(63) Continuation-in-part of application No. 09/667,737, filed on Sep. 22, 2000, now Pat. No. 7,185,014.

(51) Int. Cl.
  *G06F 15/16* (2006.01)
  *G06F 13/00* (2006.01)
(52) U.S. Cl. .................. 709/232; 719/315
(58) Field of Classification Search .......... 709/217–232; 719/330–332, 314–315
See application file for complete search history.

(56) References Cited

U.S. PATENT DOCUMENTS

| | | | |
|---|---|---|---|
| 4,086,434 A | 4/1978 | Bocchi | |
| 4,412,292 A | 10/1983 | Sedam et al. | |
| 4,497,037 A | 1/1985 | Kato et al. | |
| 4,583,834 A | 4/1986 | Seko et al. | |
| 4,853,946 A | 8/1989 | Elliott et al. | |
| 4,962,368 A | 10/1990 | Dobrzanski et al. | |
| 4,964,065 A | 10/1990 | Hicks et al. | |
| 4,965,946 A | 10/1990 | Hegedus et al. | |
| 4,996,703 A | 2/1991 | Gray | |
| 5,038,319 A | 8/1991 | Carter et al. | |
| 5,057,866 A | 10/1991 | Hill, Jr. et al. | |
| 5,061,837 A | 10/1991 | Gilbert et al. | |
| 5,077,582 A | 12/1991 | Kravette et al. | |
| 5,084,875 A | 1/1992 | Weinberger et al. | |
| 5,129,080 A | 7/1992 | Smith | |
| 5,138,377 A | 8/1992 | Smith et al. | |
| 5,163,151 A | 11/1992 | Bronikowski et al. | |
| 5,184,179 A | 2/1993 | Tarr et al. | |
| 5,204,699 A | 4/1993 | Birnbaum et al. | |
| 5,212,645 A | 5/1993 | Wildes et al. | |
| 5,214,772 A | 5/1993 | Weinberger et al. | |
| 5,216,461 A | 6/1993 | Maekawa et al. | |
| 5,220,380 A | 6/1993 | Hirata et al. | |

(Continued)

FOREIGN PATENT DOCUMENTS

EP    0874306    10/1998

(Continued)

OTHER PUBLICATIONS

Allegro, "RomWebClient Embedded HTTP client Toolkit", p. 2, Sep. 7, 2000—XP-002201938.

(Continued)

*Primary Examiner* — Yasin M Barqadle
(74) *Attorney, Agent, or Firm* — Fish & Richardson P.C.

(57) ABSTRACT

A system includes a server and a controller embedded in a device. Both the server and the embedded controller are capable of communicating over a computer network. The embedded controller sends a command to the server over the computer network that identifies an instance of the device. In response, the server identifies the instance of the device based on the command, retrieves data that is specific to the instance of the device, and sends the data to the embedded controller over the computer network.

30 Claims, 7 Drawing Sheets

U.S. PATENT DOCUMENTS

| | | |
|---|---|---|
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholz et al. |
| 5,736,965 A | 4/1998 | Mosebrook et al. |
| 5,740,801 A | 4/1998 | Branson |
| 5,745,268 A | 4/1998 | Eastvold et al. |
| 5,748,892 A | 5/1998 | Richardson |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama et al. |
| 5,911,095 A | 6/1999 | Atsumi et al. |
| 5,913,060 A | 6/1999 | Discavage |
| 5,917,405 A | 6/1999 | Joao |
| 5,923,842 A | 7/1999 | Pedersen et al. |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |

| Patent | Kind | Date | Inventor |
|---|---|---|---|
| 5,956,698 | A | 9/1999 | Lachese et al. |
| 5,961,586 | A | 10/1999 | Pedersen |
| 5,968,116 | A | 10/1999 | Day et al. |
| 5,970,149 | A | 10/1999 | Johnson |
| 5,974,234 | A | 10/1999 | Levine et al. |
| 5,975,737 | A | 11/1999 | Crater et al. |
| 5,991,810 | A | 11/1999 | Shapiro et al. |
| 6,003,061 | A | 12/1999 | Jones et al. |
| 6,003,070 | A | 12/1999 | Frantz |
| 6,003,078 | A | 12/1999 | Kodimer et al. |
| 6,006,045 | A | 12/1999 | Miyawaki |
| 6,009,274 | A | 12/1999 | Fletcher et al. |
| 6,009,284 | A | 12/1999 | Weinberger et al. |
| 6,012,088 | A | 1/2000 | Li et al. |
| 6,014,631 | A | 1/2000 | Teagarden et al. |
| 6,014,691 | A | 1/2000 | Brewer et al. |
| 6,014,694 | A | 1/2000 | Aharoni et al. |
| 6,016,535 | A | 1/2000 | Krantz et al. |
| 6,021,284 | A | 2/2000 | Serizawa et al. |
| 6,022,315 | A | 2/2000 | Iliff |
| 6,023,223 | A | 2/2000 | Baxter, Jr. |
| 6,023,507 | A | 2/2000 | Wookey |
| 6,023,721 | A | 2/2000 | Cummings |
| 6,023,749 | A | 2/2000 | Richardson |
| 6,025,925 | A | 2/2000 | Davidson, Jr. et al. |
| 6,031,964 | A | 2/2000 | Anderson |
| 6,041,041 | A | 3/2000 | Ramanathan et al. |
| 6,042,111 | A | 3/2000 | Rivers et al. |
| 6,057,857 | A | 5/2000 | Bloomfield |
| 6,060,994 | A | 5/2000 | Chen |
| 6,061,603 | A | 5/2000 | Papadopoulos et al. |
| 6,064,915 | A | 5/2000 | Kaneko et al. |
| 6,065,118 | A | 5/2000 | Bull et al. |
| 6,081,623 | A | 6/2000 | Bloomfield et al. |
| 6,088,718 | A | 7/2000 | Altschuler et al. |
| 6,091,915 | A | 7/2000 | Takagishi |
| 6,098,116 | A | 8/2000 | Nixon et al. |
| 6,101,407 | A | 8/2000 | Groezinger |
| 6,108,492 | A | 8/2000 | Miyachi |
| 6,112,035 | A | 8/2000 | Kuroyanagi et al. |
| 6,112,256 | A | 8/2000 | Goffinet et al. |
| 6,115,489 | A | 9/2000 | Gupta et al. |
| 6,118,899 | A | 9/2000 | Bloomfield et al. |
| 6,119,934 | A | 9/2000 | Kolls |
| 6,122,463 | A | 9/2000 | Nagatani |
| 6,125,363 | A | 9/2000 | Buzzeo et al. |
| 6,130,999 | A | 10/2000 | Serizawa et al. |
| 6,139,177 | A | 10/2000 | Venkatraman et al. |
| 6,141,737 | A | 10/2000 | Krantz et al. |
| 6,152,365 | A | 11/2000 | Kolls |
| 6,157,944 | A | 12/2000 | Pedersen |
| 6,161,145 | A | 12/2000 | Bainbridge |
| 6,167,432 | A | 12/2000 | Jiang |
| 6,167,448 | A | 12/2000 | Hemphill et al. |
| 6,172,683 | B1 | 1/2001 | Bloomfield |
| 6,175,866 | B1 | 1/2001 | Holloway et al. |
| 6,181,331 | B1 | 1/2001 | Trainor et al. |
| 6,189,113 | B1 | 2/2001 | Rabb et al. |
| 6,196,735 | B1 | 3/2001 | Inamine |
| 6,205,466 | B1 | 3/2001 | Karp et al. |
| 6,209,048 | B1 | 3/2001 | Wolff |
| 6,221,011 | B1 | 4/2001 | Bardy |
| 6,226,650 | B1 | 5/2001 | Mahajan et al. |
| 6,230,199 | B1 | 5/2001 | Revashetti et al. |
| 6,246,485 | B1 | 6/2001 | Brown et al. |
| 6,256,378 | B1 | 7/2001 | Iggulden et al. |
| 6,256,668 | B1 * | 7/2001 | Slivka et al. ............ 709/220 |
| 6,260,148 | B1 | 7/2001 | Aggarwal et al. |
| 6,260,248 | B1 | 7/2001 | Cramer et al. |
| 6,282,454 | B1 | 8/2001 | Papadopoulos et al. |
| 6,282,711 | B1 * | 8/2001 | Halpern et al. ............ 717/175 |
| 6,286,038 | B1 * | 9/2001 | Reichmeyer et al. ......... 709/220 |
| 6,286,059 | B1 | 9/2001 | Sugiura |
| 6,289,461 | B1 | 9/2001 | Dixon |
| 6,292,828 | B1 | 9/2001 | Williams |
| 6,295,527 | B1 | 9/2001 | McCormack et al. |
| 6,298,457 | B1 | 10/2001 | Rachlin et al. |
| 6,304,895 | B1 | 10/2001 | Schneider et al. |
| 6,307,570 | B1 | 10/2001 | Stergiades |
| 6,308,099 | B1 * | 10/2001 | Fox et al. .................. 607/31 |
| 6,311,024 | B1 | 10/2001 | Serizawa et al. |
| 6,312,378 | B1 | 11/2001 | Bardy |
| 6,317,570 | B1 | 11/2001 | Uchida et al. |
| 6,317,783 | B1 | 11/2001 | Freishtat et al. |
| 6,317,848 | B1 | 11/2001 | Sorens et al. |
| 6,325,540 | B1 | 12/2001 | Lounsberry et al. |
| 6,327,594 | B1 | 12/2001 | Van Huben et al. |
| 6,338,086 | B1 | 1/2002 | Curtis et al. |
| 6,343,320 | B1 | 1/2002 | Fairchild et al. |
| 6,356,933 | B2 | 3/2002 | Mitchell et al. |
| 6,356,949 | B1 | 3/2002 | Katsandres et al. |
| 6,366,741 | B1 | 4/2002 | Fukushima |
| 6,368,284 | B1 | 4/2002 | Bardy |
| 6,370,552 | B1 | 4/2002 | Bloomfield |
| 6,370,570 | B1 | 4/2002 | Muir et al. |
| 6,370,582 | B1 * | 4/2002 | Lim et al. .................. 709/230 |
| 6,377,162 | B1 | 4/2002 | Delestienne et al. |
| 6,377,971 | B1 | 4/2002 | Madden et al. |
| 6,381,557 | B1 | 4/2002 | Babula et al. |
| 6,397,212 | B1 | 5/2002 | Biffar |
| 6,405,310 | B1 | 6/2002 | Simpson |
| 6,406,426 | B1 | 6/2002 | Reuss et al. |
| 6,412,026 | B1 | 6/2002 | Graf |
| 6,415,023 | B2 | 7/2002 | Iggulden |
| 6,415,392 | B1 | 7/2002 | Suzuki et al. |
| 6,421,671 | B1 | 7/2002 | Bryan et al. |
| 6,426,798 | B1 | 7/2002 | Yeung |
| 6,430,612 | B1 | 8/2002 | Iizuka |
| 6,430,711 | B1 | 8/2002 | Sekizawa et al. |
| 6,434,572 | B2 | 8/2002 | Derzay et al. |
| 6,437,692 | B1 | 8/2002 | Petite et al. |
| 6,437,803 | B1 | 8/2002 | Panasyuk et al. |
| 6,438,598 | B1 | 8/2002 | Pedersen |
| 6,446,192 | B1 | 9/2002 | Narasimhan et al. |
| 6,449,633 | B1 | 9/2002 | Van et al. |
| 6,449,663 | B1 | 9/2002 | Carney et al. |
| 6,453,127 | B2 | 9/2002 | Wood et al. |
| 6,453,129 | B1 | 9/2002 | Simpson et al. |
| 6,457,038 | B1 | 9/2002 | Defosse |
| 6,462,831 | B1 | 10/2002 | Akiyama |
| 6,466,971 | B1 | 10/2002 | Humpleman et al. |
| 6,471,521 | B1 | 10/2002 | Dornbush et al. |
| 6,477,117 | B1 | 11/2002 | Narayanaswami et al. |
| 6,479,792 | B1 | 11/2002 | Beiermann et al. |
| 6,487,513 | B1 | 11/2002 | Eastvold et al. |
| 6,493,517 | B1 | 12/2002 | Hanson |
| 6,493,871 | B1 * | 12/2002 | McGuire et al. ............ 717/173 |
| 6,494,831 | B1 | 12/2002 | Koritzinsky |
| 6,510,350 | B1 | 1/2003 | Steen, III et al. |
| 6,523,013 | B2 | 2/2003 | Shah et al. |
| 6,523,063 | B1 | 2/2003 | Miller et al. |
| 6,523,130 | B1 | 2/2003 | Hickman et al. |
| 6,529,848 | B2 | 3/2003 | Sone |
| 6,538,667 | B1 | 3/2003 | Duursma et al. |
| 6,549,612 | B2 | 4/2003 | Gifford et al. |
| 6,553,336 | B1 | 4/2003 | Johnson et al. |
| 6,553,490 | B1 | 4/2003 | Kottapurath et al. |
| 6,559,965 | B1 | 5/2003 | Simpson et al. |
| 6,560,611 | B1 | 5/2003 | Nine et al. |
| 6,560,641 | B1 | 5/2003 | Powderly et al. |
| 6,560,656 | B1 * | 5/2003 | O'Sullivan et al. ........... 709/250 |
| 6,564,227 | B2 | 5/2003 | Sakakibara et al. |
| 6,567,813 | B1 | 5/2003 | Zhu et al. |
| 6,574,729 | B1 | 6/2003 | Fink et al. |
| 6,581,092 | B1 | 6/2003 | Motoyama et al. |
| 6,581,094 | B1 | 6/2003 | Gao |
| 6,587,812 | B1 | 7/2003 | Takayama |
| 6,591,272 | B1 | 7/2003 | Williams |
| 6,598,011 | B1 | 7/2003 | Howards Koritzinsky et al. |
| 6,601,087 | B1 | 7/2003 | Zhu et al. |
| 6,601,159 | B1 | 7/2003 | Smith et al. |
| 6,604,212 | B2 | 8/2003 | Sekizawa et al. |
| 6,609,108 | B1 | 8/2003 | Pulliam et al. |
| 6,611,863 | B1 | 8/2003 | Banginwar |
| 6,631,407 | B1 | 10/2003 | Mukaiyama et al. |
| 6,636,899 | B1 | 10/2003 | Rabb et al. |
| 6,643,650 | B1 | 11/2003 | Slaughter et al. |
| 6,643,690 | B2 | 11/2003 | Duursma et al. |

| | | | | | | |
|---|---|---|---|---|---|---|
| 6,646,655 | B1 | 11/2003 | Brandt et al. | 7,032,005 | B2 | 4/2006 | Mathon et al. |
| 6,651,110 | B1 | 11/2003 | Caspers et al. | 7,043,677 | B1 | 5/2006 | Li |
| 6,651,190 | B1 | 11/2003 | Worley et al. | 7,046,134 | B2 | 5/2006 | Hansen |
| 6,654,032 | B1 | 11/2003 | Zhu et al. | 7,051,084 | B1 | 5/2006 | Hayton et al. |
| 6,654,720 | B1 | 11/2003 | Graham et al. | 7,057,724 | B1 | 6/2006 | Mead et al. |
| 6,654,726 | B1 | 11/2003 | Hanzek | 7,065,576 | B2 | 6/2006 | Kamel et al. |
| 6,665,425 | B1 | 12/2003 | Sampath et al. | 7,069,298 | B2 | 6/2006 | Zhu et al. |
| 6,670,810 | B2 | 12/2003 | Duncan et al. | 7,072,946 | B2 | 7/2006 | Shafer |
| 6,671,695 | B2 | 12/2003 | McFadden | 7,079,010 | B2 | 7/2006 | Champlin |
| 6,681,344 | B1 | 1/2004 | Andrew | 7,080,267 | B2 | 7/2006 | Gary et al. |
| 6,681,349 | B2 | 1/2004 | Sekizawa | 7,082,426 | B2 | 7/2006 | Musgrove et al. |
| 6,684,259 | B1 | 1/2004 | Discavage et al. | 7,082,460 | B2 | 7/2006 | Hansen et al. |
| 6,686,838 | B1 | 2/2004 | Rezvani et al. | 7,085,814 | B1 | 8/2006 | Gandhi et al. |
| 6,687,848 | B1 | 2/2004 | Najmi | 7,085,824 | B2 | 8/2006 | Forth et al. |
| 6,687,873 | B1 | 2/2004 | Ballantyne et al. | 7,089,567 | B2 | 8/2006 | Girardot et al. |
| 6,691,106 | B1 | 2/2004 | Sathyanarayan | 7,091,846 | B2 | 8/2006 | Wu |
| 6,691,154 | B1 | 2/2004 | Zhu et al. | 7,092,370 | B2 | 8/2006 | Jiang et al. |
| 6,691,157 | B2 | 2/2004 | Muir et al. | 7,099,110 | B2 | 8/2006 | Detzler |
| 6,704,807 | B1 | 3/2004 | Mathur et al. | 7,100,200 | B2 | 8/2006 | Pope et al. |
| 6,710,893 | B1 | 3/2004 | Hou et al. | 7,103,357 | B2 | 9/2006 | Kirani et al. |
| 6,711,593 | B1 | 3/2004 | Gordon et al. | 7,103,799 | B2 | 9/2006 | Dixon |
| 6,711,618 | B1 | 3/2004 | Danner et al. | 7,113,988 | B2 | 9/2006 | Chirashya et al. |
| 6,717,513 | B1 | 4/2004 | Sandelman et al. | 7,116,681 | B1 | 10/2006 | Hovell et al. |
| 6,738,798 | B1 | 5/2004 | Ploetz et al. | 7,117,239 | B1 | 10/2006 | Hansen |
| 6,754,664 | B1 | 6/2004 | Bush | 7,117,243 | B2 | 10/2006 | Peart |
| 6,757,714 | B1 | 6/2004 | Hansen | 7,127,525 | B2 | 10/2006 | Coleman et al. |
| 6,757,899 | B2 | 6/2004 | Zhdankin et al. | 7,130,883 | B2 | 10/2006 | Zhu et al. |
| 6,763,274 | B1 | 7/2004 | Gilbert | 7,142,839 | B2 | 11/2006 | Pelaez et al. |
| 6,763,501 | B1 | 7/2004 | Zhu et al. | 7,149,792 | B1 | 12/2006 | Hansen |
| 6,766,333 | B1 | 7/2004 | Wu et al. | 7,158,483 | B1 | 1/2007 | Takabatake et al. |
| 6,775,238 | B1 | 8/2004 | Suzuki et al. | 7,162,315 | B2 | 1/2007 | Gilbert |
| 6,779,004 | B1 | 8/2004 | Zintel | 7,162,628 | B2 | 1/2007 | Gentil et al. |
| 6,782,542 | B1 | 8/2004 | Mein et al. | 7,178,149 | B2 | 2/2007 | Hansen |
| 6,785,015 | B1 | 8/2004 | Smith et al. | 7,185,014 | B1 * | 2/2007 | Hansen ........................ 707/10 |
| 6,785,713 | B1 | 8/2004 | Freeman et al. | 7,194,743 | B2 | 3/2007 | Hayton et al. |
| 6,785,726 | B1 | 8/2004 | Freeman et al. | 7,203,755 | B2 | 4/2007 | Zhu et al. |
| 6,789,112 | B1 | 9/2004 | Freeman et al. | 7,213,051 | B2 | 5/2007 | Zhu et al. |
| 6,789,119 | B1 | 9/2004 | Zhu et al. | 7,216,172 | B2 | 5/2007 | Yang et al. |
| 6,792,337 | B2 | 9/2004 | Blackett et al. | 7,234,943 | B2 | 6/2007 | Aleali |
| 6,799,209 | B1 | 9/2004 | Hayton | 7,254,601 | B2 | 8/2007 | Baller et al. |
| 6,799,270 | B1 | 9/2004 | Bull et al. | 7,266,526 | B1 | 9/2007 | Drummond et al. |
| RE38,609 | E | 10/2004 | Chen et al. | 7,290,061 | B2 | 10/2007 | Lentini et al. |
| 6,804,712 | B1 | 10/2004 | Kracht | 7,293,176 | B2 | 11/2007 | Otway et al. |
| 6,807,580 | B2 | 10/2004 | Freeman et al. | 7,330,872 | B2 | 2/2008 | Peart et al. |
| 6,810,488 | B2 | 10/2004 | Teng | 7,334,119 | B2 | 2/2008 | Gentil et al. |
| 6,816,616 | B2 | 11/2004 | Teng | 7,340,772 | B2 | 3/2008 | Panasyuk et al. |
| 6,823,397 | B2 | 11/2004 | Rawson, III | 7,346,842 | B1 | 3/2008 | Hayton et al. |
| 6,826,606 | B2 | 11/2004 | Freeman et al. | 7,353,253 | B1 | 4/2008 | Zhao |
| 6,831,555 | B1 | 12/2004 | Miller et al. | 7,359,953 | B2 | 4/2008 | Muir et al. |
| 6,832,239 | B1 | 12/2004 | Kraft et al. | 7,376,695 | B2 | 5/2008 | Duursma et al. |
| 6,832,373 | B2 * | 12/2004 | O'Neill ........................ 717/171 | 7,421,484 | B2 | 9/2008 | Das |
| 6,834,298 | B1 | 12/2004 | Singer et al. | 7,444,071 | B2 | 10/2008 | Chen |
| 6,842,903 | B1 | 1/2005 | Weschler | 7,453,379 | B2 | 11/2008 | Plamondon |
| 6,857,013 | B2 | 2/2005 | Ramberg et al. | 7,460,038 | B2 | 12/2008 | Samuels et al. |
| 6,886,046 | B2 | 4/2005 | Stutz et al. | 7,490,166 | B2 | 2/2009 | Yang et al. |
| 6,891,830 | B2 | 5/2005 | Curtis | 7,496,097 | B2 | 2/2009 | Rao et al. |
| 6,901,448 | B2 | 5/2005 | Zhu et al. | 7,502,726 | B2 | 3/2009 | Panasyuk et al. |
| 6,904,593 | B1 | 6/2005 | Fong et al. | 7,502,784 | B2 | 3/2009 | Collins |
| 6,920,480 | B2 | 7/2005 | Mitchell et al. | 7,529,767 | B2 | 5/2009 | DeAnna et al. |
| 6,922,724 | B1 | 7/2005 | Freeman et al. | 7,532,134 | B2 | 5/2009 | Samuels et al. |
| 6,925,335 | B2 | 8/2005 | May et al. | 7,542,471 | B2 | 6/2009 | Samuels et al. |
| 6,925,645 | B2 | 8/2005 | Zhu et al. | 7,555,529 | B2 | 6/2009 | Bloomfield et al. |
| 6,928,469 | B1 | 8/2005 | Duursma et al. | 7,562,121 | B2 | 7/2009 | Berisford |
| 6,940,405 | B2 | 9/2005 | Script et al. | 7,562,146 | B2 | 7/2009 | Panasyuk et al. |
| 6,950,991 | B2 | 9/2005 | Bloomfield et al. | 7,562,226 | B2 | 7/2009 | Aiken et al. |
| 6,952,714 | B2 | 10/2005 | Peart | 7,565,526 | B1 | 7/2009 | Shaw et al. |
| 6,963,899 | B1 | 11/2005 | Fernandez et al. | 7,581,005 | B2 | 8/2009 | Montemayor et al. |
| 6,972,676 | B1 | 12/2005 | Kimmel et al. | 7,584,294 | B2 | 9/2009 | Plamondon |
| 6,983,020 | B2 | 1/2006 | Christiansen | 7,587,755 | B2 | 9/2009 | Kramer |
| 6,985,779 | B2 | 1/2006 | Hsiung et al. | 7,593,514 | B1 | 9/2009 | Zhuang et al. |
| 6,986,040 | B1 | 1/2006 | Kramer et al. | 7,594,018 | B2 | 9/2009 | Pedersen |
| 6,990,395 | B2 | 1/2006 | Ransom et al. | 7,596,593 | B2 | 9/2009 | Mitchell et al. |
| 7,003,574 | B1 | 2/2006 | Bahl | 7,606,902 | B2 | 10/2009 | Rao et al. |
| 7,016,966 | B1 | 3/2006 | Saulpaugh et al. | 7,609,721 | B2 | 10/2009 | Rao et al. |
| 7,020,706 | B2 | 3/2006 | Cates et al. | 7,613,131 | B2 | 11/2009 | Decasper et al. |
| 7,020,773 | B1 | 3/2006 | Otway et al. | 7,617,531 | B1 | 11/2009 | Chauhan et al. |
| 7,028,025 | B2 | 4/2006 | Collins | 7,619,545 | B2 | 11/2009 | Samuels et al. |
| 7,028,081 | B2 | 4/2006 | Kawashima | 7,656,799 | B2 | 2/2010 | Samuels et al. |
| 7,031,342 | B2 | 4/2006 | Teng | 7,657,657 | B2 | 2/2010 | Rao et al. |

| | | |
|---|---|---|
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 2001/0007117 A1 | 7/2001 | Cooper et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka |
| 2001/0056547 A1 | 12/2001 | Dixon |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0133753 A1 | 9/2002 | Mayberry et al. |
| 2002/0135801 A1 | 9/2002 | Tessman |
| 2002/0138567 A1* | 9/2002 | Ogawa ............ 709/203 |
| 2002/0144016 A1 | 10/2002 | Spicer et al. |
| 2002/0157090 A1 | 10/2002 | Anton, Jr. |
| 2002/0174085 A1* | 11/2002 | Nelson et al. ........... 707/1 |
| 2002/0178241 A1* | 11/2002 | Eriksson ............. 709/222 |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1* | 3/2003 | Miyata et al. ........... 709/328 |
| 2003/0063119 A1 | 4/2003 | Bloomfield et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0118353 A1 | 6/2003 | Chiarella |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu |
| 2003/0200285 A1* | 10/2003 | Hansen et al. .......... 709/220 |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027373 A1 | 2/2004 | Calder et al. |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |
| 2006/0069662 A1 | 3/2006 | Braddy et al. |
| 2006/0069668 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri et al. |
| 2006/0159432 A1 | 7/2006 | Mazzaferri et al. |
| 2006/0161555 A1 | 7/2006 | Mazzaferri et al. |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shahbazi et al. |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |

| | | |
|---|---|---|
| 2006/0248144 A1 | 11/2006 | Zhu |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock et al. |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |

FOREIGN PATENT DOCUMENTS

| | | |
|---|---|---|
| EP | 1 191 744 | 3/2002 |
| EP | 1191744 A2 * | 3/2002 |
| EP | 1 362 282 | 11/2003 |
| EP | 1 695 485 | 8/2006 |
| FR | 2797728 | 2/2001 |
| GB | 2305820 | 4/1997 |
| JP | 60-263162 | 12/1985 |
| JP | 09-305407 | 11/1997 |
| JP | 09-325925 | 12/1997 |
| JP | 11-045195 | 2/1999 |
| JP | 11-203079 | 7/1999 |
| JP | 11-296453 | 10/1999 |
| JP | 2000-112863 | 4/2000 |
| JP | 200122952 | 4/2000 |
| JP | 2000-163283 | 6/2000 |
| JP | 2000-278773 | 10/2000 |
| JP | 2000-309145 | 11/2000 |
| JP | 2001-337817 | 12/2001 |
| JP | 2003-223603 | 8/2003 |
| WO | WO97/30879 | 1/1997 |
| WO | WO98/20439 | 5/1998 |
| WO | WO98/33302 | 7/1998 |
| WO | WO98/38910 | 9/1998 |
| WO | WO98/41943 | 9/1998 |
| WO | WO 99/21336 | 4/1999 |
| WO | WO99/21336 | 4/1999 |
| WO | WO99/57649 | 11/1999 |
| WO | WO 99/57837 | 11/1999 |
| WO | WO99/57838 | 11/1999 |
| WO | WO99/64598 | 12/1999 |
| WO | WO99/64958 | 12/1999 |
| WO | WO00/23894 | 4/2000 |
| WO | WO 02/10919 | 2/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | WO02/25501 | 3/2002 |
| WO | WO 02/25501 | 3/2002 |
| WO | WO/0225501 | 3/2002 |
| WO | WO03/021464 | 3/2003 |
| WO | WO03/054439 | 7/2003 |
| WO | WO2004/059447 | 7/2004 |
| WO | WO2006/009402 | 1/2006 |
| WO | WO2008/083177 | 7/2008 |

OTHER PUBLICATIONS

Allegro, "Total Solutions for Embedded Development", p. 1, Oct. 6, 2002—XP-002201939.

Steinfeld, Edward, "Making the Change from Standalone to Internet Appliance", Circuit Cellar Online, pp. 1-7, Apr. 2000.

A International Search Report dated Sep. 24, 2001.

Database WIP, Section EI, Week 200156, Abstract, Document No. XP002253876 (Korea Electronics & Telecom Res Inst.) Derwent Publications, Ltd., London, GB, Mar. 5, 2001.

Box, et al., Simple Object Acces Protocol (SOAP) 1.1, Document No. XP002250270, May 8, 2000.

Edward Steinfeld, "Making the Change" Document No. XP002201937, Apr. 2000, Circuit Cellar Online.

International Search Report, PCT/US03/11707, Apr. 16, 2003.
Office Action for U.S. Appl. No. 09/667,737 mailed Feb. 23, 2004.
Steinfeld "From Standalone To Internet Appliance" circuit cellar online, 'online! Apr. 2000, pp. 1-7, XP002201937 retrieved from the internet: <url: http://www. chipcenter. com/circuitcell ar/apriloo/pdf/co4ooespdf. pdf>43,48, 'retrieved on Jun. 2002-lo.
"RomWebClient Embedded HTTP client 1-61 Toolkit" Allegrosoft, 'Online! Jul. 9, 2000 (2000-07-091, pp. 1-2, XPOO2201938 Retrieved from the Internet: <URL: http://web. archive. org/web/2000070920 4234/http://www.allegrosoft.com/romwebclient. html> retrieved on Jun. 12, 2002 the whole document.
Allegro Software product release 1-61 overview Greenhills Software Inc., 'Online! Jun. 10, 2002 (Jun. 6-lo), pp. 1-1, XPOO2201939 Retrieved from the Internet: URL: http://www. ghs. com/partners/allegro/>'retrieved on Jun. 10, 2002! the whole document.
http://www.linuxjournal.com/article.php?sid=4195.
International Search Report in parent corresponding application PCT/US01/29787.
CORBA and XML Integration in Enterprise Systems—Ennis (2000); www.iona.com/info/techcenter/ecoop2000apr17.pdf.
Implementing Incremental Code Migration with XML, Emmerich, W. et al, IEEE, 4-11, Jun. 2000.
XML-based Data System for Earth Science Applications, Suresh, R et al.; IEEE 2000 Internation, vol. 3, pp. 242-28, Jul. 2000.
http://www.upnp.org/download/UPnPDA10_20000613.htm (52 pgs).
Webmethods B2B Whitepaper; www.cs.wisc.edu/~vganti/papers/b2b_wpB2Bintegration.html.
Virtual reality transfer protocol (vrtp); www.stl.nps.navy.mil/~brutzman/vrtp.
The Simple Times, vol. 7, No. 1, Mar. 1999; www.simple-times.org/pub/simple-times/issues/7-1.html.
Edward F. Steinfeld "Internet-appliance technology automates test equipment" EDN Magazine, pp. 157-169, Oct. 2000, www.edbmag.com.
Tom Williams "Java Goes To Work Controlling Networked Embedded Systems" Computer Design, Pennwell Publ. Littleton, MA, 35:9:36-37, Aug. 1996.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, pp. 152-157 (Jun. 2000).
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1998).
Koppen, E., et al., "Active Hypertext for Distributed Web Applications", Enabling Technologies: Infrastructure for Collaborative Enterprises, (WET ICE '99), Proc. IEEE 8th Int'l. Workshop (1999), pp. 297-302.
Mason, K., "XML Translation for block structured languages", IBM Corporation: Research Disclosure, Kenneth Mason Publications, 44176 (2001).
Schmidt, The Evolution of Workflow Standards, IEEE (1999).
SOAP Archives Online, "Multiple Method Calls in SOAP Packet"; [online] Retrieved from the Internet:<URL:http://discuss.develop.com/archives/wa.exe?A2=ind9912&L=soap&T=O&F=&S=&P=25113>, [retrieved on Dec. 8, 2000].
Wu et al., "A knowledge sharing and collaboration system model based on Internet", Systems, Man, and Cybernetics, 1999. IEEE SMC'99 Conference Proceedings, vol. 2, pp. 148-152 (1999).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 22, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
"Frequently Asked Questions about the Extensible Markup Language—The XML FAQ" Version 1.41 (http://www.oasis-open.org/cover/xmlFAQ141-19981006.html) (Oct. 6, 1998).
24×7, HealthTech Publishing Company, Inc. (Nov. 1996).
"Remote Diagnostics: Strategic weapon in the war for multi-vendor service contracts," Tech Assessment, vol. 3, No. 12, (Dec. 1995).
"Siemens Medical, BJC Health System Extend deal to multivendor service," Medical Imaging News, vol. 6, No. 26, (Jun. 27, 1997).
SCAN Diagnostic Imaging, vol. 8, No. 24, (Dec. 27, 1995).
Literature Search by Keyword: CyberTAC (Apr. 22, 2005).
Allegro Software product release 1-61 overview Greenhills Software Inc., [online] Jun. 10, 2002, pp. I-I, XPOO2201939 Retrieved from the Internet: <URL: http://www.ghs.com/partners/allegro/> [retrieved on Jun. 10, 2002].
Allegro, RomWebCLient Embedded HTTP client Toolkit: Allegrosoft, Circuit Cellar Online, (Sep. 7, 2000) XP-002201983, Retrieved from the Internet: <URL:http://www.allegrosoft.com/romwebclient.html>[retrieved on Jun. 10, 2002].
Box, et al., Simple Object Acces Protocol (SOAP) 1.1, Document No. XP002250270, (May 8, 2000).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 2001).
Eastvold, Roger, "Tiss and Tell," Medical Imaging, (Sep. 1995).
Eastvold, Roger, "Services: The Next Generation," The Professional Journal, vol. 20, No. 4 (Nov. 1996).
EBITS:Electronic Business & Information Technology for Society Research Consortium, Proposal for Development of an Educational and Research Infrastructure for Safe Electronic Commerce, [online] Retrieved from the Internet:<URL:http://www.cs.dartmouth.edu/~makedon/cs188/proposal.html>, [retrieved Feb. 15, 2005].
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).

EmWare Press Release: "emWare Delivers EMIT 3.0 SDK Pro-A Complete Device Networking Kit for Developing End-to-end, Embedded Device Networking Solutions," Salt Lake City, UT (May 1999).

EmWare Press Release: "emWare, IBM Demonstrate Next Phase in Establishing Worldwide Access to Embedded Devices," Chicago, IL (Mar. 1999).

EmWare Press Release: "emWare's emLink (TM) Used to Internet-enable Welch Allyn's Vital Signs Monitor," Chicago, IL (Mar. 1999).

EmWare Press Release: "Invensys Selects emWare EMIT Device-Networking Software to Add Remote Monitoring and Control Capabilities to its Controller Products," Salt Lake City, UT (Jun. 1999).

EmWare Press Release: "Motorola, Mitsubishi and National Semiconductor Join emWare's Embed The Internet Alliance," Chicago, IL (Mar. 1999).

Hanckmann, J., "Telescript: The Emerging Standard for Intelligent Messaging," Philips Telecommunications Review, vol. 52(1), pp. 15-19 (Mar. 1994).

Universal Plug & Play Device Architecture, (C) Microsoft Corporation (Jun. 8, 2000), [online] Retrieved from the Internet: <URL:http://www.upnp.org/specs/arch/upnpda10_20000613.htm>, [retrieved on Nov. 24, 2008].

Incremona, A. "Remote Service Diagnostics for Imaging Equipment: Today and Tomorrow," Advanced Imaging, 12(9):90(2) (1997).

Jennyc, K., "Linking Enterprise Business Systems to the Factory Floor," The Hewlett-Packard Journal, Article 9 (May 1998).

Kimball, R., "XML Will Make it Easier," Intelligent Enterprise, (Apr. 16, 2001) [online] Retrieved from the Internet: <URL:http://www.intelligententerprise.com/010416/ webhouse1_1.jhtml> [retrieved on Nov. 24, 2008].

Kovar, J., "Xerox Unveils Expanded Channel Lineup; Also Plans to Introduce E-Mail, Queue Management Software," PC Expo,(Jun. 1999).

Lassman, M. et al., "Modern Nuclear Medical Diagnostics with Efficient Gamma Cameras," Electromedica, 66(2):43-51, (1998).

Layman, et al., "XML-Data," Position Paper from Microsoft Corp. (Jun. 1997), [online] Retrieved from the Internet:<URL:http://www.oasis-open.org/cover/xml-data9706223.html> [retrieved on Sep. 2, 2004].

Lerner, R., "At the Forge: Introducing SOAP", Linux Journal, #XP002292162 (Mar. 2001).

Lindley, D., "Xerox unveils copier that phones for help," Rochester Democrat and Chronicle, (Mar. 28, 1990).

Luh, James C., "With several specs complete, XML enters widespread development," Internet World, (Jan. 4, 1999).

Math Markup Language (Chapter 4); [online] Retrieved from the Internet:<URL:http://www.w3.org/TR/REC-MathML/chap4_4.html>, [retrieved on Feb. 15, 2005].

McBride, R.A., "Security Considerations for Active Messages," ACM SIGICE Bulletin, vol. 22 (2), pp. (Oct. 1996).

Memphis Educational Computer Connectivity Alliance (MECCA), [online] Retrieved from the Internet:<URL:http://www.mecca.org/~ltague/nsfnocostextension.html>, [retrieved on Feb. 15, 2005].

Orasis Medical Services, Inc., Business Plan Copy No. 001, (Nov. 1995).

Pfeiffer, R., "XML Tutorials for Programmers: Tutorial 2: Writing XML Documents," (1999) [online] Retrieved from the Internet:<URL:http://imb.com/xml/>, [retrieved on Mar. 2, 1999].

Questra Applications Data Sheet (2002).

Questra Preliminary Invalidity Contentions, dated Apr. 29, 2005.

Reagan, K., "Technology for the Soul," OC Metro, (Sep. 1, 1995).

Rytting, T., "Dispensing the Goods, Embedded Style," Circuit Cellar Online, (Oct. 1999).

Steinfeld, E., "From Standalone to Internet Appliance", Circuit Cellar Online, [online] (Jul. 9, 2000), #XP002201938, Retrieved from the Internet: <URL:http://web.archive.org/web/20000709204234/ http://www.alegrosoft.com/romwebclient.html>retrieved on Jun. 12, 2002 the whole document.

Steinfeld, E., "Internet-appliance technology automates test equipment" EDN Magazine, pp. 157-169, Oct. 2000, www.edbmag.com.

Steinfeld, E., "Making the Change" Document No. XP002201937, Apr. 2000, Circuit Cellar Online.

Suresh et al., "XML-based Data System for Earth Science Applications", IEEE 2000 International, vol. 3, pp. 242-28, Jul. 2000.

The Next Bang: The Expolosive Combination of Embedded Linux, XML, and Instant Mess, (Issue 77) [online] Retrieved from the Internet: <URL:http://www.linuxjournal.com/article.php?sid=4195>, [retrieved on Nov. 20, 2001].

The Simple Times, vol. 7, No. 1, (Mar. 1999); [online] Retrieved from the Internet:<URL:http://www.simple-times.org/pub/simple-times/issues/7-1.html> [retrieved on Aug. 3, 2005].

Trewitt, G., "Using Tcl to Process HTML Forms," Digital Network Systems Laboratory, NSL Technical Note TN-14, Palo Alto, CA (Mar. 1994).

Virtual Reality Transfer Protocol (VRTP); [online] Retrieved from the Internet:<URL:http://www.stl.nps.navy.mil/~brutzman/vrtp> (1998).

Walsh, Norman, "XSL The Extensible Style Language: Styling XML Documents," New Architect Daily, (Jan. 1999).

webmethods B2B Whitepaper; [online] Retrieved from the Internet:<URL:http://www.cs.wisc.edu/~vganti/papers/b2b_wpB2Bintegration.html> (1999).

White Paper, Medical Imaging, East Providence, RI (Sep. 1995).

Wigget, Jeremy, "Intraview: Roger Eastvold of Orasis Inc.," 24×7, (Nov. 1996).

Williams, T., "Java Goes To Work Controlling Networked Embedded Systems" Computer Design, Pennwell Publ. Littleton, MA, 35:9:36-37, (Aug. 1996).

Winer, Dave, "XML-RPC Specification," (http://XML-RPC.com), (Jun. 15, 1999).

Winter 1992, Field of View, vol. 2, No. 3, Toshiba America Medical System, Inc.

Xerox 190 Copier, Electronic Data Interface Operator Guide, ver. 1.0, (1989).

Mills et al., "A knowledge-based method for inferring semantic concepts from visual models of system behavior," ACM (Jul. 2000), pp. 306-337.

Application and Response History in U.S. Appl. No. 09/627,201 as retrieved from PAIR, through Mar. 15, 2004.

Application and Response History in U.S. Appl. No. 10/805,012 as retrieved from PAIR, through Jan. 24, 2007.

Action and Response History in U.S. Appl. No. 09/667,737 as retrieved from PAIR, through Jan. 9, 2007.

Application and Response History in U.S. Appl. No. 09/716,717, as retrieved from PAIR, through May 1, 2007.

Application and Response History in U.S. Appl. No. 11/677,279, as retrieved from PAIR, through Nov. 28, 2008.

Action and Response History in U.S. Appl. No. 09/708,384 as retrieved from PAIR, through Aug. 16, 2006.

Action and Response History in U.S. Appl. No. 11/503,638 as retrieved from PAIR, through Oct. 22, 2008.

Franklin, M. et al., "Data in Your Face: PUSH Technology in Perspective", Proc. ACM SIGMOD Int'l Conf. on Mgmt of Data, (Jun. 1998), #XP000886180, pp. 516-519.

Martin, D., "Protessional XML"., WROX Press Ltd., pub., Ch. 11, 'Server to Server', pp. 559-562, 819-820 (2000).

Lewandowska, J., et al., "System for Grouping Technologically Similar Devices", v. 48 n 12; (Dec. 1975), pp. 636-638 (English Abstract).

Kafeza, E. et al., "Alerts in Mobile Healthcare Applications: Requirements and Pilot Study", IEEE, vol. 8, No. 2, pp. 173-181 (Jun. 2004).

Chandler, T. et al., "The Technology Development of Automatic Metering and Monitoring Systems", Int'l Power Engineering Conf. 2005, IEEE, 4 pgs.

Van der Werff, M., et al., "A Mobile-Based Home Automatic System", IEEE Mobility Conference, 5 pgs. (2005).

Examination Report in EP Application No. 01973431.8, dated Feb. 6, 2009.

Action and Response History in U.S. Appl. No. 10/123,960, through Feb. 24, 2009.

Action and Response History in U.S. Appl. No. 10/028,126, through Feb. 19, 2009.

Bock, G., "Mainstreaming XML-based Enterprise Applications: Using Oracle XML DB to Manage Financial Information within a Global Banking System", Oracle Corporation, (C) 2003.

International Preliminary Report on Patentability in Application No. PCT/US2007/088858, dated Jul. 9, 2009.
Application and Response History in U.S. Appl. No. 10/805,012.
Action and Response History in U.S. Appl. No. 10/124,181.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9.
Oral Proceeding Minutes with European Application No. 01955993.9.
Communication dated Apr. 26, 2005 in European Application No. 01955993.9.
"Siemens Medical, BJC Health System Extend deal to multivendor service," Medical Imaging News, vol. 6, No. 26, Jun. 27, 1997.
Application and Response History in U.S. Appl. No. 11/677,279.
International Search Report in Application No. PCT/US2002/040058, dated Nov. 3, 2003.
International Preliminary Examination Report in Application No. PCT/US2002/040058, dated Jun. 10, 2004.
Defense Information Systems Agency, Field Services Office, White Paper Report "pcAnywhere 10.5" (Sep. 2003).
Search Report in EP Application No. 02792391.1, dated Nov. 19, 2009.
Examination Report in EP Application No. 01973431.8, dated Mar. 23, 2010.
Examination Report in EP Application No. 02792391.1, dated Mar. 10, 2010.
International Search Report &. Written Opinion in Application No. PCT/US2007/088858, dated May 21, 2008.
Action and Response History in U.S. Appl. No. 11/616,136.
Action and Response History in U.S. Appl. No. 11/503,638.
Action and Response History in U.S. Appl. No. 11/537,399.
Wikipedia, "GoToMyPC", [online] Retrieved from the Internet<URL:http://en.wikipedia.org/wiki/Gotomypc> [retrieved on Jan. 21, 2010] (2010).
Citrix Online, Citrix Systems, Inc. Whilte Paper, "GoToMyPC Security", [online] Retrieved from the Internet: <URL:http://www.citrix.it/REPOSITORY/docRepository/ id_979_1124821417888736.pdf> [retrieved on Mar. 16, 2010] (2004).
Citrix Online, Citrix Systems, Inc. Whilte Paper, "GoToMyPC Corporate Technology", [online] Retrieved from the Internet: <URL:http://www.gotomypc.com/downloads/pdf/m/GoToMyPC_Corporate_Technology_White_Paper.pdf> [retrieved on Mar. 16, 2010] (2004).
ExpertCity, Inc., Whilte Paper, "GoToMyPC: Making Life Simpler for Teleworkers and Travelers", [online] Retrieved from the Internet: <URL:http://www.si.umich.edu/Classes/540/Placement/GoOvrvew.pdf> [retrieved on Mar. 16, 2010] (2001).
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Action and Response History in U.S. Appl. No. 11/677,279.
Action and Response History in U.S. Appl. No. 11/673,943.
Action and Response History in U.S. Appl. No. 10/784,138.
Action and Response History in U.S. Appl. No. 11/538,402.
Action and Response History in U.S. Appl. No. 11/616,136.
Summons to attend Oral Proceedings in counterpart EP Application No. 01973431.8, dated Feb. 2, 2011.
English Translation of Action in Japanese Patent Application No. 2002-515578, dated Jul. 26, 2011.
Oral Proceedings Communication in Application No. EP01973431.8, dated May 12, 2011.
Decision to Refuse in Application No. EP01973431.8, dated Jun. 21, 2011.
Action and Response History in U.S. Appl. No. 11/774,474.

* cited by examiner

RETRIEVING DATA FROM A SERVER

CROSS-REFERENCE TO RELATED APPLICATION

This application is a continuation-in-part of U.S. patent application Ser. No. 09/667,737, filed on Sep. 22, 2000 now U.S. Pat. No. 7,185,014 in the name of James R. Hansen.

BACKGROUND

This invention relates to a controller embedded in a device (an "embedded controller") that retrieves data from a remote server for a specific instance of the device.

A device may contain an embedded controller, such as a microprocessor, to monitor and control its operation. Any type of device may have an embedded controller, including, but not limited to, home appliances, such as washing machines, dishwashers, and televisions, and manufacturing equipment, such as robotics, conveyors and motors.

Embedded controllers, also referred to as "embedded devices", are often connected to an internal network, such as a local area network (LAN), with an interface to the Internet. Other devices on the internal network may communicate with the embedded controllers over the internal network. However, the embedded controllers are not generally addressable from the Internet. To address this problem, the embedded device may initiate communications with an addressable external device. That is, the embedded device may access the external device (e.g., a server) periodically to obtain necessary data.

SOAP is a standard for encoding function calls, such as remote procedure calls (RPCs), in XML. SOAP defines rules, i.e., a syntax, for encoding the function calls in XML. The body of a SOAP command is defined, at its start, by <SOAP-ENV:BODY> and, at its end, by </SOAP-ENV:BODY>. Code in between these two commands includes the function to be performed by the SOAP command. A SOAP command may include other data as well, such as header information.

SUMMARY

In general, in one aspect, the invention is directed to a controller embedded in a device for retrieving data from a server. The controller sends a command to the server that identifies an instance of the device and receives, from the server and in response to the command, data that is specific to the instance of the device. The data identifies additional data to retrieve for the device.

This aspect of the invention may include one or more of the following. The command may include an operational parameter for the device and the data may include an updated value for the operational parameter. The command may include plural operational parameters for the device and the data may include updated values that differ from current values of the operational parameters.

The data may include a list of operational parameters. In this case, the embedded controller sends a second command to the server, which includes operational parameters from the list, and receives, from the server and in response to the second command, updated values of one or more of the operational parameters included in the second command. The data may include a list of operations to be performed by the controller. In this case, the embedded controller parses the operations from the list and performs the operations from the list.

The data may include a configuration file for the device. The command identifies the instance of the device by a device type and/or one or more of a serial number and a universal unique identifier. The embedded controller sends the command to the server periodically. The server runs the Hypertext Transfer Protocol and the command contains Extensible Markup Language code. The device receives the data via the Hypertext Transfer Protocol.

The command may include a first operational parameter for the device and the data may include a second operational parameter that is unrelated to the first operational parameter. The data may include a uniform resource locator. The uniform resource locator is used to obtain additional data that relates to the device. The data may include an indication that additional data for the device is present at the server. A second command is sent to the server to retrieve the additional data. The server retrieves the additional data in response to the second command. Parameters in the command determine a content of the data. The data may be encrypted when the data is received and then decrypted. The data may contain a digital signature when the data is received, which is then authenticated. The data may include a list of operations to be performed by the controller. The list of operations includes Simple Object Access Protocol calls that are scripted using Extensible Markup Language.

In general, in another aspect, the invention is directed to a server for sending data over a network to a controller embedded in a device. The server receives a command from the embedded controller, identifies an instance of the device from information in the command, retrieves data that is specific to the instance of the device, and sends the data to the embedded controller. The data identifies additional data for the embedded controller to retrieve.

This aspect of the invention may include one or more of the following features. The command may include a device type and/or one or more of a serial number and a universal unique identifier. The instance of the device may be identified based on the device type and/or one or more of the serial number and the universal unique identifier. The server may parse the device type and one or more of the serial number and universal unique identifier from the command prior to identifying the instance of the device.

The command may include an operational parameter for the device. The data may include an updated value of the operational parameter. The data may include a list of operational parameters for the device. The server receives a second command from the embedded controller, which includes an operational parameter from the list of operational parameters, obtains an updated value of the operational parameter, and sends the updated value of the operational parameter to the embedded controller.

The data may include a list of operations to be performed by the embedded controller. The data may include a configuration file for the device. The server may receive the data specific to the instance of the device and store the data in memory, from which it is retrieved. The data specific to the instance of the device may be received via a Web page generated by the server. The server may run the Hypertext Transfer Protocol and the command may contain Extensible Markup Language code. The data may be stored in a queue and retrieved from the queue.

In general, in another aspect, the invention is directed to a system that includes a controller embedded in a device that is capable of communicating over a computer network, and a server that is capable of communicating over the computer network. The embedded controller sends a command to the server over the computer network that identifies an instance of the device and, in response, the server (i) identifies the instance of the device based on the command, (ii) retrieves data that is specific to the instance of the device, and (iii) sends the data to the embedded controller over the computer network. The data identifies additional data for the embedded controller to retrieve.

This aspect of the invention may include one or more of the following features. The embedded controller is not remotely-addressable from the computer network. The computer network is the Internet. The server runs the Hypertext Transfer Protocol and the command may contain Extensible Markup Language code.

Heretofore, SOAP commands were only available as individual, discrete commands. This is impractical for device-initiated communication, particularly if the device is unaware of any timing issues relating to execution of the SOAP commands. The invention therefore scripts one or more SOAP commands in XML and provides the XML script to a device, such as an embedded controller, for execution. The XML script is executed by the embedded controller, much like a computer program, to control execution of the SOAP commands. For example, timing and sequence of execution of the SOAP commands may be specified in the XML script.

The invention also defines variables in the XML script, which may be passed to and from the SOAP commands. This facilitates the combination of SOAP commands in XML script and provides an advantage over the use of traditional SOAP commands, which are limited to passing "hard-coded" numerical values (i.e., non-variables).

In general, in one aspect, the invention is directed to a computer-implemented system for processing a simple object access protocol (SOAP) command. The system includes interpreting an XML script to perform a function contained in the XML script, the XML script containing the SOAP command, parsing the SOAP command from the XML script, and passing the SOAP command to a SOAP interpreter for execution. This aspect of the invention may include one or more of the following features.

Plural SOAP commands may be contained in the XML script. The plural SOAP commands may be passed to the SOAP interpreter. The plural SOAP commands may be executed in a sequence specified by the XML script. At least one of an argument and a return value may be received from the SOAP command following execution of the SOAP command. The argument may be stored as a variable in the XML script.

The XML script may declare a variable. A value of the variable may be passed as an argument to the SOAP command prior to executing the SOAP command. The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that affects a sequence of execution of the XML script and/or the SOAP command when an error condition exists. The function may be a statement that controls relative or absolute time to execute the SOAP command. Parsing may be performed by an XML interpreter and executing may be performed by the SOAP interpreter. The XML interpreter may pass the SOAP command to the SOAP interpreter and the SOAP interpreter may pass an output of the SOAP command to the XML interpreter.

In general, in another aspect, the invention is directed to a computer-implemented system for generating extensible markup language (XML) script that contains a simple object access protocol (SOAP) command. The system includes receiving code that defines a function and the SOAP command and translating the code to XML script that performs the function and contains the SOAP command. This aspect of the invention may include one or more of the following features.

The XML script may be provided to a device. The device may include a controller that executes the XML script. The code may contain plural SOAP commands and functions. The XML script may contain the plural SOAP commands and functions. The XML script may declare a variable. A value of the variable value may be passed as an argument to the SOAP command in the XML script.

The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that that affects a sequence of execution of the XML script and/or the SOAP command when an error condition exists. The function may be a statement that controls a relative or absolute time to execute the SOAP command.

Other features and advantages of the invention will become apparent from the following description, including the claims and drawings.

DESCRIPTION

Figure 1:
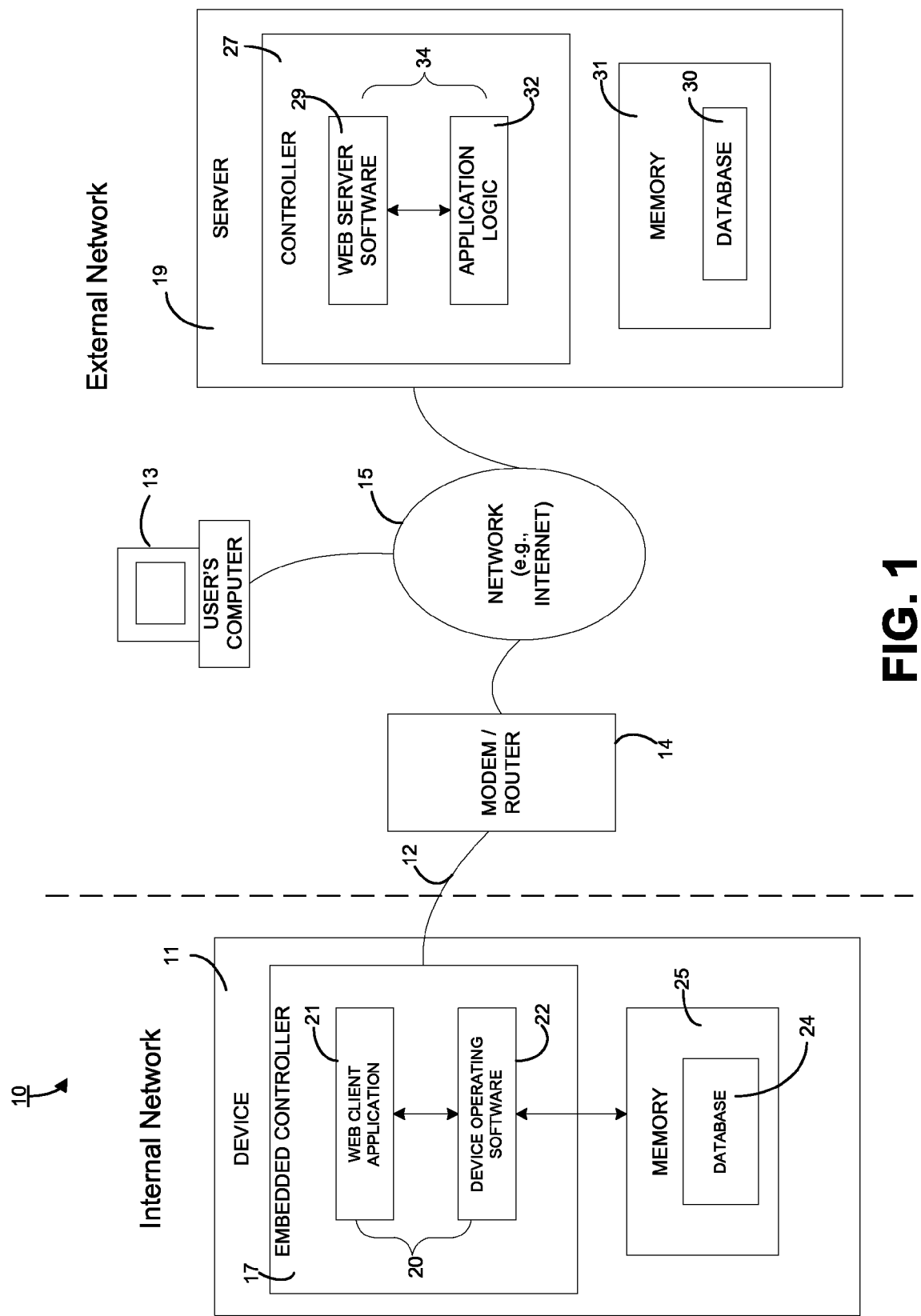
FIG. 1 is a block diagram of a network containing a server and a device having an embedded controller.

FIG. 1 shows a network 10. Network 10 includes a device 11 containing an embedded controller 17. Device 11 is any type of apparatus or system having functions that are monitored and controlled by embedded controller 17.

Device 11 is connected to an internal network 12, such as a LAN. A router or modem 14 couples internal network 12 to an external network 15, such as the Internet/World Wide Web (Web). External network 15 runs TCP/IP (Transmission Control Protocol/Internet Protocol) or some other suitable protocol. Network connections are via Ethernet, telephone line, wireless, or other transmission media.

External network 15 contains a server 19, which is a computer or any other processing device. Server 19 communicates with embedded controller 17 over external network 15 and internal network 12. Embedded controller 17 has a local IP (Internet Protocol) address that can be resolved within internal network 12. However, this local IP address may not be recognizable by devices on external network 15, such as server 19. As such, server 19 may not be able to directly address device 11.

Embedded Controller

Embedded controller 17 runs software 20, which includes web client application 21 and operating software 22. Web client application 21 includes a TCP/IP protocol stack that allows embedded controller 17 to communicate over external network 15. Device operating software 22 provides an interface between Web client application 21 and a database 24. Through device operating software 22, embedded controller 17 retrieves data stored in database 24 and stores data in database 24.

Database 24 is stored in a memory 25 on device 11 or internal to embedded controller 17. Database 24 stores data, including operational parameters, configuration files, and identification information for device 11.

The operational parameters constitute settings and/or control instructions for the device 11, which are implemented by embedded controller 17. The types of operational parameters that are stored in database 24 depend on the nature of device 11. For example, if device 11 is a heating/cooling system, the operational parameters may include temperature levels, humidity levels, airflow controls, vent/duct open/close controls, and fan motor speed settings. A configuration file is a file that contains a set of one or more operational parameters for an instance of device 11.

What is meant by "instance" is the specific identity of device 11 as distinguished from other identical devices. The identification information stored in database 24 identifies the instance of device 11. This identification information includes, but is not limited to, data identifying the type of the device, a common (or "friendly") name for the device, the manufacturer of the device, the model name of the device, the model number of the device, the serial number of the device, and a universal unique identifier (UUID) for the device.

The device type specifies a uniform resource locator (URL) for the device, which includes the name of the device. This information identifies a Web site that is associated with, and generated by, server 19 for the device. For example, a device type might be:

www.SonyVideo.com/television/Wega/XBR400 for a Sony® Wega® XBR400® television that includes an embedded controller. The common name of the device is how the device is known in the vernacular, e.g., "television". The manufacturer identifies the manufacturer of the device, e.g., Sony®. The model name identifies the particular model of the device, e.g., Wega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-0050DAB7BAC5. Of the data shown above, only the serial number and the UUID are unique to the instance of device 11.

Server

Server 19 is a computer that runs HTTP (Hypertext Transfer Protocol). Server 19 includes a controller 27, such as a microprocessor, for executing software to perform the functions described below. To avoid confusion in terminology, the following reads as though those functions are performed by server 19, even though software in controller 27 of server 19 performs the functions.

Server 19 executes Web server software 29 to communicate over external network 15. Web server software 29 also hosts a Web page associated with device 11. The Web page (not shown) is displayed on computer 13 of a user, such as the owner of device 11, who may input updated operational parameters for the device. These input updated operational parameters are transmitted to Web server software 29 over external network 15. Web server software 29 stores the updated parameters in database 30.

Web server software 29 stores and retrieves data in database 30 using application logic 32. Application logic 32 is software for accessing database 30 using the CGI (Common Gateway Interface) protocol. CGI is a well-known protocol for accessing a database. The operational parameters can be stored in database 30 individually or as part of a configuration file for an instance of device 11.

Database 30 is stored in a memory 31, which is inside of, or external to, server 19. Database 30 stores data associated with device 11, including the operational parameters noted above. Other data that may be stored for device 11 is described below.

The Data Transfer Process

Figure 2:
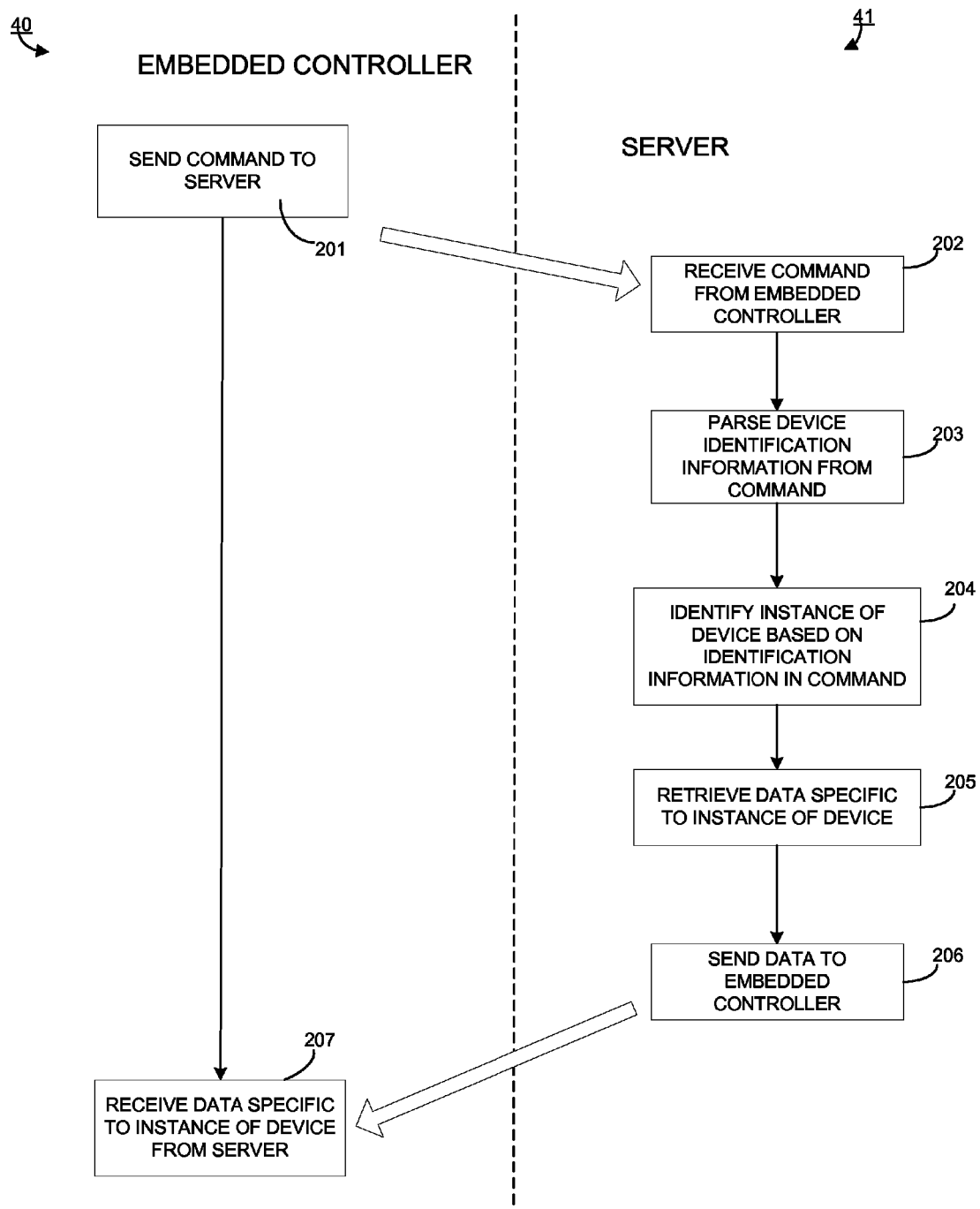
FIG. 2 is a flowchart showing a process by which the embedded controller retrieves data for the device from the server.

Embedded controller 17 executes software 20 to retrieve data, such as operational parameters, from remote server 19. Server 19 executes software 34 to send the data to embedded controller 17. FIG. 2 shows these processes in detail. The left half of FIG. 2, titled "Embedded Controller" shows process 40 performed by embedded controller 17, and the right half of FIG. 2, titled, "Server", shows process 41 performed by server 19.

Process 40 generates and sends (201) a command to server 19. The command, or a modified version thereof, is sent by embedded controller 17 to server 19 periodically. It is through this command that embedded controller 17 polls server 19 to determine if there are any new/updated operational parameters for device 11.

The command includes data identifying device 11. The data identifies the specific instance of device 11 and includes a device type field and one or both of a device serial number field and a device UUID. The command may also include the common name field, the manufacturer name field, the model name field, and the model number field, as set forth above.

The command may be either an HTTP GET command or an HTTP post command. The data included in those commands is similar, with the difference being that the HTTP GET command retrieves a document, such as a configuration file, that contains operational parameters and the HTTP POST command retrieves individual operational parameters. An example of an HTTP GET command is shown in Appendix A and an example of an HTTP POST command is shown in Appendix B.

The HTTP POST and GET commands shown in Appendices A and B contain XML (eXtensible Markup Language) commands. XML is a self-describing computer language in the sense that fields in the XML code identify variables and their values in the XML code. For example, as shown in the Appendices, the "manufacturer" field identifies a manufacturer, e.g., Sony®, and is delineated by "<manufacturer>" to indicate the start of the field and "</manufacturer>" to indicate the end of the field. XML is used because it can be generated, parsed and read relatively easily by server 19 and embedded controller 17.

As noted, the GET command is used to retrieve a document from server 19. The document to be retrieved corresponds to the fields in the GET command, in particular to the device type, serial number and/or UUID fields. By contrast, the POST command is used to retrieve individual operational parameters. The operational parameters that are to be retrieved are listed in the POST command itself. Changing these parameters changes the information the server provides to the embedded controller. By way of example, as shown in Appendix B, the operational parameters include airflow, humidity, motor and vent values for the fictitious "widget"

device. The current values of these parameters are specified in the POST command shown in Appendix B as follows:

```
<parameters>
    <Airflow xsd:type="integer">378</Airflow>
    <Humidity xsd:type="double">46.7</Humidity>
    <Motor xsd:type="integer">1500</Motor>
    <Vent xsd:type="integer">4</Vent>
</parameters>
```

The updated values of these parameters are returned by server 19 to embedded controller 17 in a reply POST command. The updated values of these parameters are specified in the POST command shown in Appendix B as follows:

```
<parameters>
    <Motor xsd:type="integer">1250</ Motor >
    <Vent xsd:type="integer">2</Vent>
</parameters>
```

As shown, both the POST and GET commands include the URL of the device in the device type field. As described below, this directs server 19 to a Web site associated with device 11 and, thereafter, in the case of a GET Command, to retrieve a specific Web page that is generated for the device by server 19 or any other device in communication with network 15. It is noted that, since the POST command retrieves parameters, not a document like the GET command, the POST command need not include a URL of the device.

Referring back to FIG. 2, process 41 (in server 19) receives (202) the command from embedded controller 17. Process 41 identifies the command as either a POST or GET command based on a header, such as "POST/CONTROL HTTP/1.1" (see the headers in Appendices A and B), in the command. Process 41 uses an XML parser to parse (203) the various identifying fields, such as device type, serial number, and UUID, from the command.

Process 41 identifies (204) the instance of device 11 based on the information parsed from the command. That is, process 41 uses the device type, serial number, and UUID field information to identify the instance.

If the Command is a POST Command

The remaining identification information from the command is used to narrow the search through database 30 down to data for the specific instance of device 11. The device serial number and/or UUID are used to retrieve operational parameters specific to device 11.

Once the appropriate data has been identified (204), process 41 retrieves (205) that data using application logic 32. Process 41 compares the values of the operational parameters to those included in the POST command. If the values are the same, process 41 returns an indication that there are no new/updated values for device 11. If the values of the operational parameters are different, process 41 adds the appropriate updated value fields to the POST command and sends (206) the POST command, with the updated operational parameters, back to embedded controller 17. Thus, only those operational parameters that differ from their original values are returned to embedded controller 17 in the POST command.

If the Command is a GET Command

As was the case above with the POST command, the remaining identification information from the command is used to narrow the search through database 30 down to data for the specific instance of device 11. In particular, the device serial number and/or UUID are used to retrieve (205) a configuration file that is specific to device 11. Process 41 sends (206) the configuration file to embedded controller 17. The configuration file may be a Web page identified by the URL in the device type field. This Web page is generated by server 19 using parameters stored in database 30 and then sent to device 11. It is noted that the complete Web page itself need not be stored. Alternatively, the GET command may retrieve separate configuration files and Web pages.

Process 40 in embedded controller 17 receives (207) the data (operational parameters or configuration file) from server 19 in response to sending (201) the command. Process 40 uses the data to update/reset device 11. For example, if device 11 is a heating system, a new operational parameter may be a new temperature setting for its thermostat. In this example, embedded controller 17 sets the new temperature accordingly. If the device is a television, a new operational parameter may indicate that certain pay television stations are now available. In this case, embedded controller 17 performs any appropriate decoding/descrambling functions on the television signal.

For both the POST and GET commands, the reply from server 19 to embedded controller 17 may contain a URL. The URL directs embedded controller 17 to a Web site that contains additional information, e.g., operational parameters and the like, for device 11. Embedded controller 17 may then retrieve any necessary information from that Web site. Additionally, the reply may contain an indication that server 19 contains additional data for embedded controller 17 to retrieve. In this case, embedded controller issues a new POST or GET command, whichever is appropriate based on the additional data identified in the reply, and processes 40,41 described herein are repeated to retrieve the additional data from server 17. The initial command and/or reply may be encrypted by server 11 and decrypted by embedded controller 17. Any of a number of commercially-available encryption technologies may be used. Server 17 may also incorporate a digital signature into the reply. Embedded controller 17 authenticates the digital signature when it receives the reply, thereby authenticating the reply.

Process 41 may also add value fields to the POST or GET command that are unrelated to the fields originally included in the POST or GET commands output by controller 17. For example, if the data retrieved (205) by process 41 includes additional parameters that require updating and that were not included in an original POST command, process 41 adds the necessary fields and parameters to the POST command that it returns to embedded controller 17. In this regard, server 11 may store data to be delivered to controller 17 in a queue. When controller 17 next contacts server 11, the data from the queue may be transferred to controller 17, regardless of whether the data corresponds to data in the original command.

ALTERNATIVE EMBODIMENT

Figure 3:
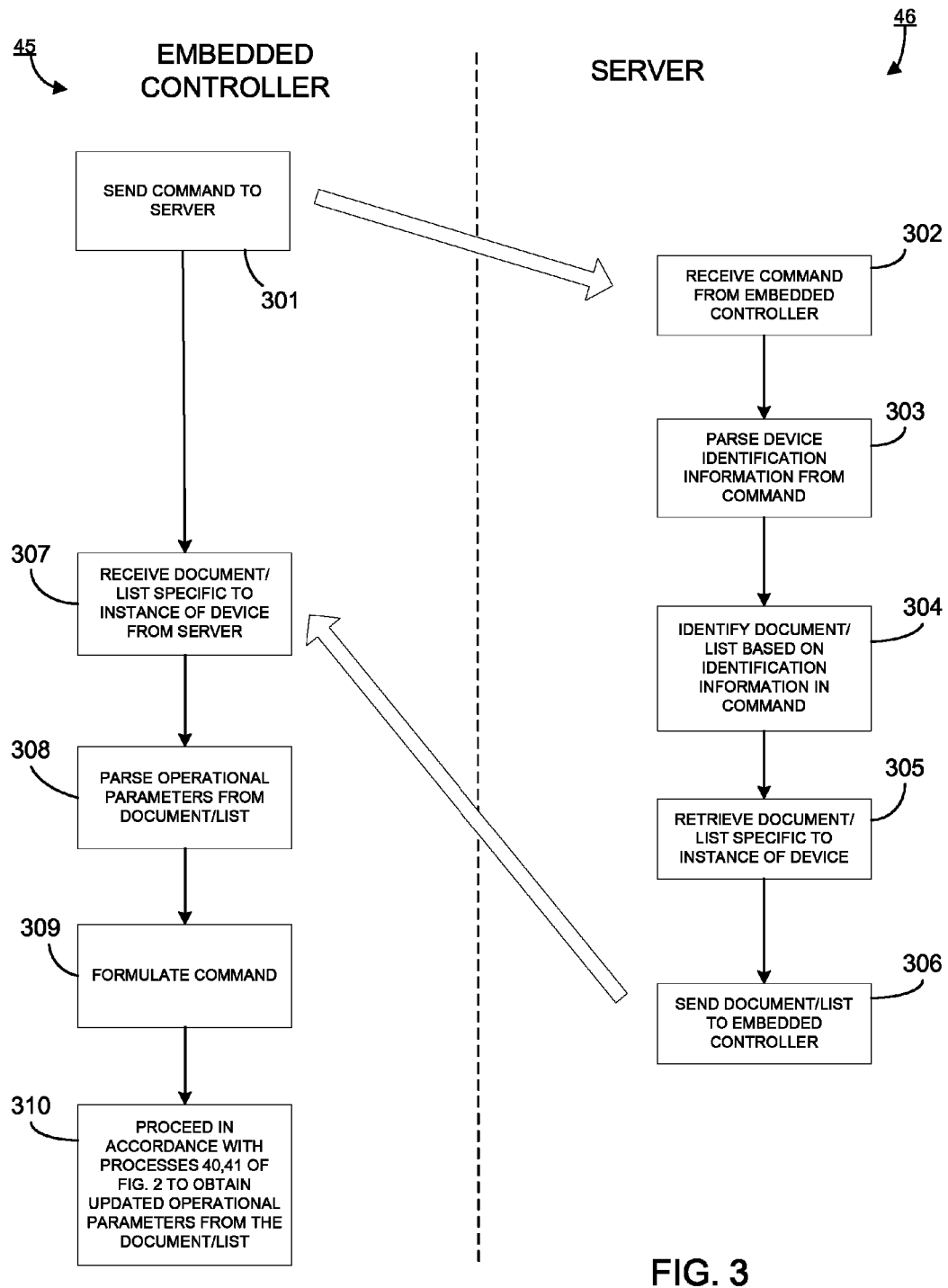
FIG. 3 is a flowchart showing an alternative process by which the embedded controller retrieves data for the device from the server.

FIG. 3 shows alternative embodiments of processes 40,41. In processes 40,41, the GET and POST commands request the same parameters each time the commands are issued. The parameters requested are "hard-coded" in the software that implements process 40. This embodiment provides a way to change the parameters that are requested without altering the software that generates the request/command.

Referring to FIG. 3, process 45 in embedded controller 17 begins by sending (301) a command to server 19. The command, in this case, is an HTTP GET command, since it is requesting a document, not individual operational parameters. The document is an XML document that contains a list of operational parameters to be updated. Using this document, embedded controller 17 can change the operational parameters that it periodically updates.

Process 46 in server 19 receives (302) the command from embedded controller 17, parses (303) the command using an XML parser to obtain the information specific to the instance of device 11, and identifies (304) the appropriate document based on this information. As before, the information that identifies the instance of device 11 includes, among other things, the device type, its serial number, and its UUID. Process 46 retrieves (305) the document containing the list of operational parameters to be updated, and sends (306) the document back to embedded controller 17.

Process 45 in embedded controller 17 receives (307) the document from server 19, parses (308) the operational parameters to be updated from the document, and formulates (309) a POST command to send to server 19. The command is formulated using a command template (not shown), into which process 45 inserts the operational parameters parsed from the document. Process 45 sends this second command to the server. At this point, processes 45 and 46 operate (310) in the same manner as processes 40 and 41, respectively, when used with a POST command. Accordingly, the details of processes 40,41 are not repeated here.

This alternative embodiment may be generalized further. For example, rather than simply retrieving a list of operational parameters, embedded controller 17 may retrieve, from server 19, a list of operations that it is to perform. For example, that list may contain operational parameters to be updated, times at which the updates are to occur, a schedule of diagnostic tests, and the like. Any operation that may be performed by embedded controller 17 may be included on the list.

The operations in the list may be Simple Object Access Protocol (SOAP) calls that are scripted using XML. Briefly, SOAP is a recognized standard for performing remote procedure calls. Scripting of SOAP calls using XML is described in U.S. patent application Ser. No. 10/123,960, now U.S. Pat. No. 7,178,149, filed concurrently herewith and entitled "XML Scripting of SOAP Commands", the contents of which are hereby incorporated by reference into this application as if set forth herein in full.

The process for retrieving the list of operations is identical to processes 45 and 46, save for the contents of the list itself. The actions that embedded controller takes once it has the list (i.e., 310) depend on the contents of the list. For example, the list might specify that parameters are to be updated every hour and may also contain a list of the parameters to be updated. The list may contain XML commands, which can be parsed by embedded controller 17. Thus, embedded controller 17 reads the commands in the list and performs the appropriate operations with respect to device 11.

Architecture

Processes 40,41 and 45,46 are not limited to use with the hardware/software configuration of FIG. 1; they may find applicability in any computing or processing environment. Processes 40,41 and 45,46 may be implemented in hardware (e.g., an ASIC {Application-Specific Integrated Circuit} and/or an FPGA {Field Programmable Gate Array}), software, or a combination of hardware and software.

Processes 40,41 and 45,46 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40,41 and 45,46.

Processes 40,41 and 45,46 may also be implemented as a computer-readable storage medium, configured with a computer program, where, upon execution, instructions in the computer program cause the computer to operate in accordance with processes 40,41 and 45,46.

The invention is not limited to use with the protocols and standards described above. For example, Web server 19 may use Java Servlets, ASP (Active Server Pages), and/or ISAPI (Internet Server Application Programming Interface) to communicate with application logic 32, instead of, or in addition to, CGI. The commands sent by embedded controller 17 and/or server 19 (e.g., in 201, 301, 310) are not limited to HTTP GET and POST commands. Any commands and/or requests for requesting and receiving data may be used.

The data transferred to embedded controller 17 by server 19 is not limited to operational parameters or configuration files. The data may include, for example, a schedule of actions to be performed by device 11 that is based on information pertaining the owner of the device. For example, owner preferences may be stored in database 30. The instance-specific data may be used by server 19 to correlate the owner of the device to the appropriate preferences. These preferences then may be transmitted back to device 11 to control the operation thereof.

The original parameters sent by embedded controller 17 to server 19 may be used by server 19 to calculate new, updated parameters based on data stored in database 30. Thus, the invention is not limited to simply retrieving updated data, but may also include calculating new data based on currently-available data.

The documents and commands described above are not limited to XML format. Any computer language may be used for the commands. The documents may be in any format, for example, HTML (Hypertext Markup Language) documents may be used. In addition, the invention is not limited to use with the Web, Web servers, and the like. The servers and embedded controllers described herein may be the same type of general-purpose computer appropriately programmed, or different devices.

Xml Scripting of Soap Commands

This invention relates generally to scripting simple object access protocol (SOAP) commands using extensible markup language (XML) and to providing the resulting XML script to a device for execution.

Figure 4:
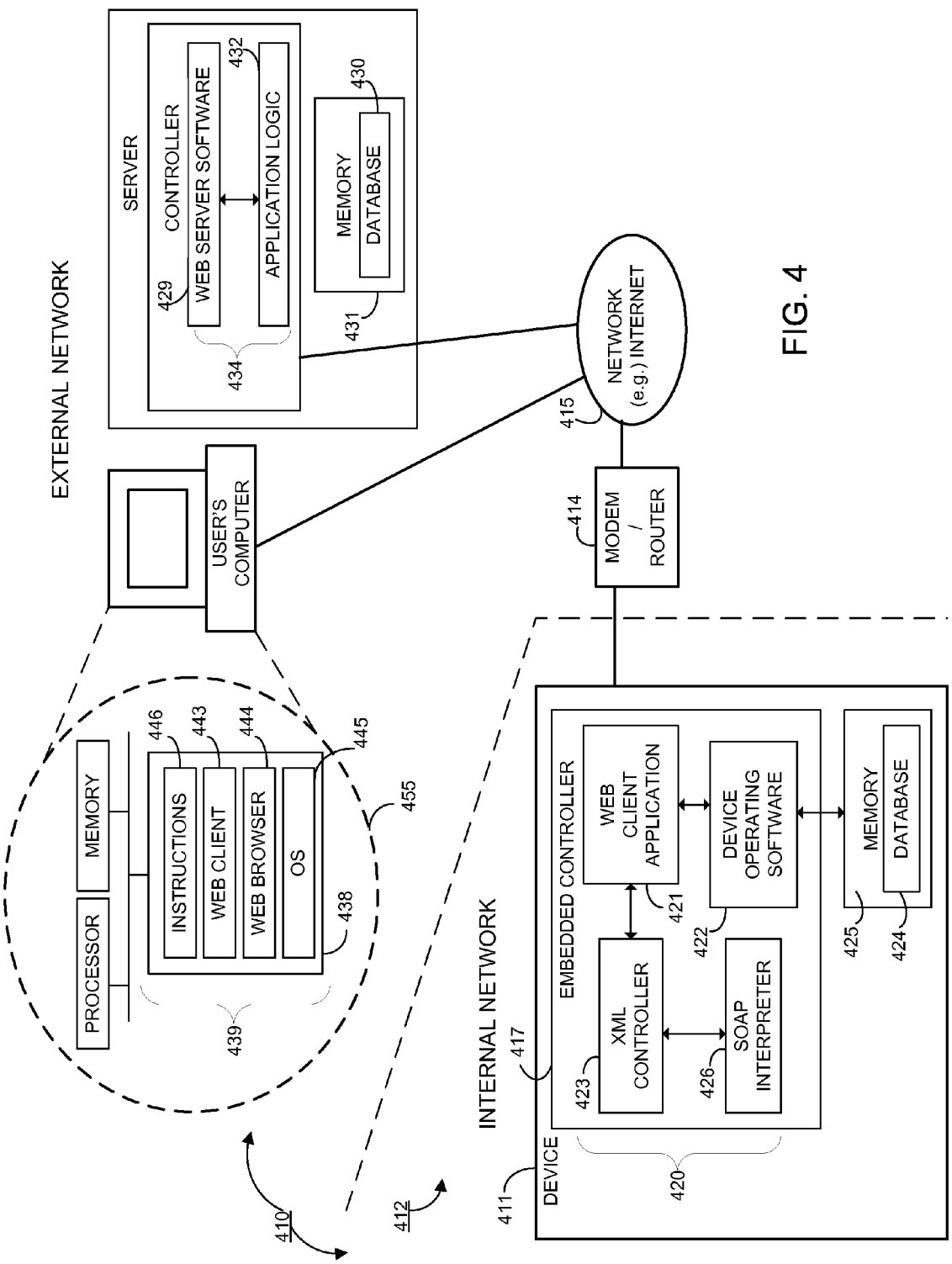
FIG. 4 is a block diagram of a network containing a server and a device having an embedded controller.

FIG. 4 shows a network 410. Network 410 includes a device 411 containing an embedded controller 417. Device 411 is any type of apparatus or system having functions that are monitored and controlled by embedded controller 417.

Device 411 is connected to an internal network 412, such as a LAN. A router or modem 414 couples internal network 412 to an external network 415, such as the Internet/World Wide Web (Web). External network 415 runs TCP/IP (Transmission Control Protocol/Internet Protocol) or some other suitable protocol. Network connections are via Ethernet, telephone line, wireless, or other transmission media.

External network 415 contains a server 419, which is a computer or any other processing device. Server 419 communicates with embedded controller 417 over external network 415 and internal network 412. Embedded controller 417 has a local IP (Internet Protocol) address that can be resolved within internal network 412. However, this local IP address may not be recognizable by devices on external network 415, such as server 419. As such, server 419 may not be able to directly address device 411.

Embedded Controller

Embedded controller 417 runs software 420, which includes Web client application 421 and operating software 422. Web client application 421 includes a TCP/IP protocol stack that allows embedded controller 417 to communicate over external network 415. Device operating software 422 provides an interface between Web client application 421 and a database 424 in memory 425. Through device operating software 422, embedded controller 417 retrieves data stored in database 424 and stores data in database 424.

Software 420 also includes an XML interpreter 423 and a SOAP interpreter 426. XML interpreter 423 is a module that receives XML script, parses the script, and performs the functions identified by the script. As background, XML is a self-describing computer language, meaning that fields in XML code identify variables and their values in the XML code. For example, a "data" field is delineated by "<data>" to indicate the start of the field and "</data>" to indicate the end of the field. XML is used because it can be generated, parsed and understood relatively easily.

Among the functions in the XML script may be an instruction to identify a SOAP command and to pass the SOAP command to SOAP interpreter 426 for processing. An example of another function includes a statement that controls relative or absolute time to execute the SOAP command. SOAP interpreter 426 receives SOAP commands from XML interpreter 423 and executes those commands. Examples of SOAP commands that can be executed by the embedded controller or agent include setting the value of a variable, uploading or downloading a file, restarting the software, or any action specific to the apparatus.

Database 424 stores data, such as operational parameters, XML script, and identification information for the instance of device 411. What is meant by "instance" is the specific identity of device 411 as distinguished from other identical devices. The identification information stored in database 424 identifies the instance of device 411. This identification information may include data identifying the type of the device, a common (or "friendly") name for the device, the manufacturer of the device, the model name of the device, the model number of the device, the serial number of the device, or a universal unique identifier (UUID) for the device.

The device type is the name of the device. The common name of the device is how the device is known in the vernacular, e.g., "television". The manufacturer identifies the manufacturer of the device, e.g., Sony®. The model name identifies the particular model of the device, e.g., Wega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-0050DAB7BAC5. Of the data shown above, generally only the serial number and the UUID are unique to the instance of device 411.

The identification data stored in database 424 is used by embedded controller 417 to retrieve XML script specific to the instance of device 411 (or for a particular type of device 411) from server 419. A device-initiated process for retrieving the XML script is described below.

Server

Server 419 is a computer that runs an HTTP (Hypertext Transfer Protocol) Web server computer program. Server 419 includes a controller 427, such as a microprocessor, for executing software to perform the functions described below. To avoid confusion in terminology, the following reads as though those functions are performed by server 419, even though software in controller 427 of server 419 performs the functions.

Server 419 executes Web server software 429 to communicate over external network 415. Web server software 429 also hosts a Web page associated with device 411. The Web page (not shown) is displayed on computer 433 of a user, such as the owner of device 411, who may select some actions to be sent to the device. For example, a remote operator may want to update three operational variables, which requires three SOAP commands. These three SOAP commands are wrapped in an XML script that executes the commands as a single operation. The XML script, along with any input updated operational parameters (if desired) are transmitted to Web server software 429 over external network 415. Web server software 429 stores the XML script in database 430 of memory 431. An example of a process for updating operational parameters is described in U.S. patent application Ser. No. 09/667,737, filed Sep. 22, 2000, the contents of which are incorporated into this application by reference as if set forth herein in full.

Web server software 429 stores and retrieves XML script from database 430 using application logic 432. Application logic 432 is software for accessing database 430 using Java servlets and a JDBC (Java Data Base Connectivity) database driver. The XML script can be stored in database 430 individually or as part of a configuration file for an instance of device 411.

Computer

Figure 5:
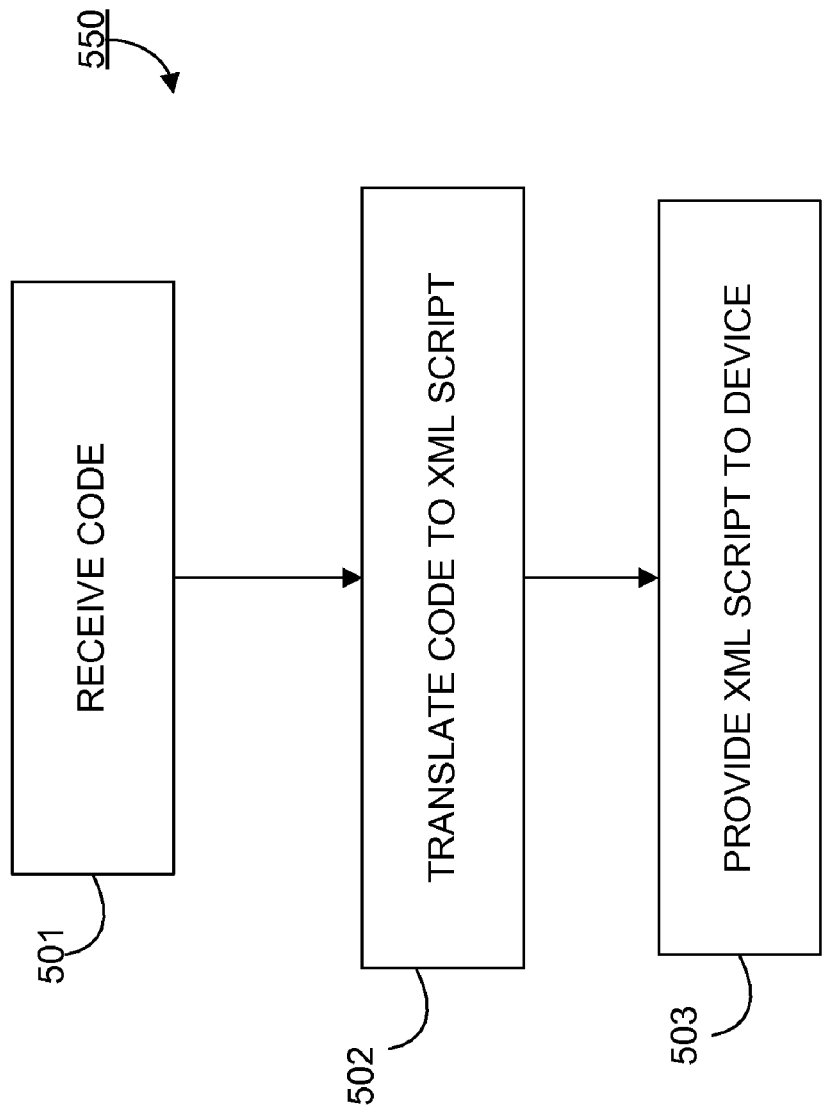
FIG. 5 is a flowchart showing a process for translating human-readable code into XML script.

Computer 433 is personal computer (PC) or other machine that includes a processor 436, a memory 437, and a storage medium 438 (see view 455). Storage medium 438 stores computer programs 439, which are executed by processor 436 out of memory 437. Computer programs 439 include a Web client application 443 containing a TCP/IP protocol stack for communicating over the Internet, a Web browser 444 such as Microsoft® Internet Explorer® for accessing Web pages, an operating system (OS) 445 such as Microsoft® Windows98®, and executable instructions 446 for implementing process 550, which is shown in FIG. 5.

Process 550 generates XML script containing one or more SOAP commands from user-generated code provided to computer 433. The code may be input by the user via a graphical user interface (GUI) (not shown), for example, or it may be retrieved from a storage medium or over network 15.

The code has a syntax that can be understood and interpreted by instructions 446. For example, the code may be a commonly-understood computer language, such as BASIC or "C", or a form of pseudo-code specific to the invention. The code defines functions, such as conditional statements (e.g., If-Then or If-Then-Else statements), control statements (e.g., do While or do Until loops), or exception handlers, meaning fail-safe mechanisms that are triggered in the code in the event that an instruction in the code fails. The functions affect the sequence of execution of the resulting XML code and/or SOAP commands.

An example of user-generated C/C++ code is set forth below:

```
int local = 8;
int total = 0;
while ( total < 10 )
{
total =SomeFunction(total);
AnotherFunction(local);
}
```

This code initializes integer variables "local" and "total" to values of "8" and "0" respectively. The code includes a "While" loop, meaning that the loop between the brackets "{ }" is continually executed while the value of total is less than "10", whereafter processing within the loop is discontinued. Within the loop, the value of "total" is set equal to the result of a SOAP command called "SomeFunction" processing the previous value of "total" and another SOAP command called "AnotherFunction" processing "local".

Process 550 receives (501) code, such as that shown above, that defines one or more functions (e.g., a "While" loop) and one or more SOAP commands (e.g., "SomeFunction" and "AnotherFunction"). Process 550 translates (502) the code to XML script that, when interpreted, performs the functions and contains the SOAP commands. To perform the translation, process 550 may compile the code, interpret the functions in the compiled code, and generate appropriate XML script from the compiled code. An appropriate compiler may be included within instructions 446 for this purpose. The format of the SOAP commands may be static and known to the compiler, or the format may be determined dynamically from a WSDL (Web Services Description Language) document. WSDL is a standard for describing SOAP commands. WSDL is itself an XML document that can be interpreted automatically. WSDL defines the set of functions available and the format of each of the SOAP commands.

WSDL usually describes the functionality for a particular device or Web service. By reading WSDL, a program can display functions to a user, then create SOAP command(s) for the function(s) selected by the user. By way of example, there may be one thousand devices, all with individual settings, and it is desired to set all of the devices to 6% lower power usage. Using traditional SOAP commands, the server must be able to address each device, obtain each device's current setting, calculate 94% of its value, then write that new value back to each device, all through issuing individual SOAP commands. Using a SOAP script, the same script can be sent to all of the devices because the variable is evaluated locally at each device. As the population of monitored devices grows, this kind of distributed processing becomes more useful.

Continuing with the example set forth above, process 550 translates (502) the code into the following XML script:

```
<Root>
<Variables>
   <local type="integer">8</local>
   <total type="integer">0</total>
</Variables>
<Script>
   <While condition="total < 10">
      <SOAP-ENV:Body>
         <SomeFunction>
            <Count>total</Count>
         </SomeFunction>
      </SOAP-ENV:Body>
      <Return variable="total"/>
      <SOAP-ENV:Body>
         <AnotherFunction>
            <Input>local</Input>
         </AnotherFunction>
      </SOAP-ENV:Body>
   </While>
</Script>
</Root>
```

The XML script contains the same functions and SOAP commands as the original C/C++ code input by the user. For example, the "While" loop is expressed as

```
<While condition="total < 10">and </While>
``` and the SOAP commands are expressed as

```
<SOAP-ENV:Body>
   <SomeFunction>
      <Count>total</Count>
   </SomeFunction>
</SOAP-ENV:Body>
``` and

```
<SOAP-ENV:Body>
   <AnotherFunction>
      <Input>local</Input>
   </AnotherFunction>
</SOAP-ENV:Body>
```

The expression "<Return variable="total"/>" returns the value of the variable "total" to the XML script. Thus, the output of the SOAP command may be passed back to the XML script as an argument in the SOAP command and used as a variable in the XML script. Also, the XML script may be written so that a variable, such as "total", is passed as an argument to a SOAP command.

An example of XML script containing a conditional "IF" statement is set forth in Appendix A attached hereto. An example of XML script containing an exception handler is set forth in Appendix B attached hereto.

After the code has been translated (502) to XML script, process 550 provides (503) the XML script to server 419 over network 415. Process 550 may send the XML script to server 419 through a Web interface, along with identification information that specifies the instance of device 411 for which the XML script is intended. Web server software 429 on server 419 receives the XML script over network 415 and application logic 432 stores the XML script in database 430, along with its associated identification information.

Device-Initiated Retrieval of the XML Script

Figure 6:
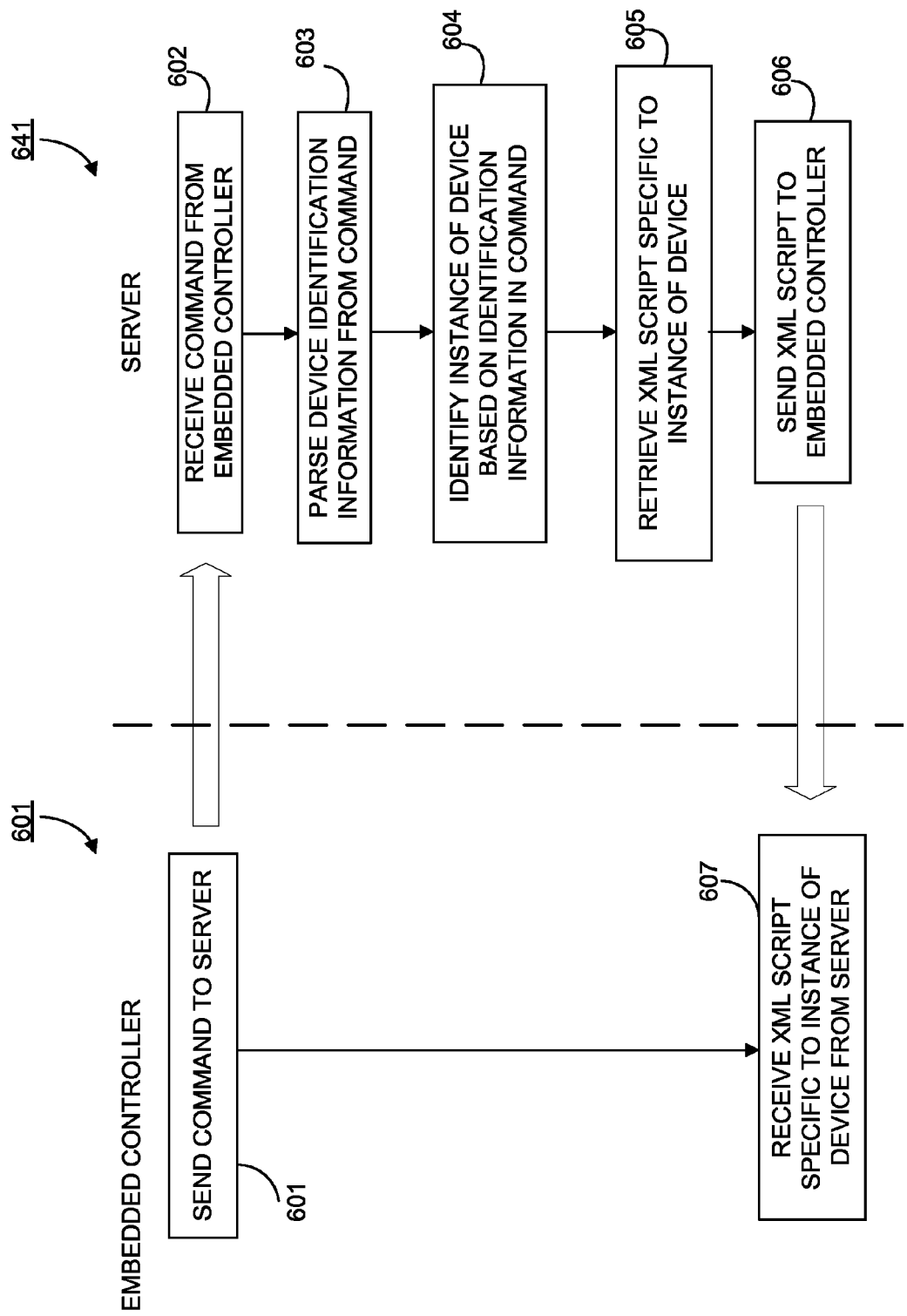
FIG. 6 is a flowchart showing a process by which the embedded controller retrieves XML script for the device from the server.

Embedded controller 417 executes software 420 to retrieve the XML script intended for device 411 from remote server 419. In response, server 419 executes software 434 to send the XML script to embedded controller 417. FIG. 6 shows these processes in detail. The left half of FIG. 6, titled "Embedded Controller" shows process 640 performed by embedded controller 417, and the right half of FIG. 6, titled, "Server", shows process 641 performed by server 419.

Process 640 generates and sends (601) a command to server 419. The command, or a modified version thereof, is sent by embedded controller 417 to server 419 periodically. It is through this command that embedded controller 417 polls server 419 to determine if there is any new/updated XML script for device 411 on server 419.

The command includes XML data identifying device 411. The data identifies the specific instance of device 411 and may include a device type field and one or both of a device serial number field and a device UUID. The command may also include a common name field, a manufacturer name field, a model name field, and a model number field, which specify the information set forth above for the device.

The command may be either an HTTP GET command or an HTTP post command. The data included in those commands is similar, with the difference being that the HTTP GET command retrieves a document, such as a file containing the XML script, and the HTTP POST command retrieves information, such as the XML script itself.

Process 641 (in server 419) receives (602) the HTTP command from embedded controller 417. Process 641 identifies the command as either a POST or GET command based on a header, such as "POST/CONTROL HTTP/1.1" (for a POST command), in the command. Process 641 uses an XML parser to parse (603) the various identifying fields, such as device type, serial number, and UUID, from the command.

Process 641 identifies (604) the instance of device 411 based on the information parsed from the command. That is, process 641 uses the device type, serial number, and UUID field information to identify the instance of device 411.

If the Command is a POST Command

The identification information from the command, in particular the device serial number and/or UUID, is used to search through database 430 for XML script specific to device 411. Once the appropriate XML script has been identified (604), process 641 retrieves (605) that XML script from database 430 using application logic 432. Process 641 determines if the XML script has been updated since it was last retrieved. This may be done by examining a revision number or date included in a header associated with the XML script. If the XML script has been updated, process 641 adds the updated XML script to the reply portion of POST command and sends (606) the POST command, with the updated XML script, back to embedded controller 417.

If the Command is a GET Command

As was the case above with the POST command, the identification information from the command is used to search through database 430 for XML script for the specific instance of device 411. In particular, the device serial number and/or UUID are used to retrieve (605) a configuration file that is specific to device 411. The configuration file contains the XML script for device 411. Process 641 sends (606) the configuration file to embedded controller 417.

Process 640 receives (607) the XML script containing one or more SOAP commands from server 419 in response to the HTTP command. Process 640 (in particular Web client application 421 in device 411) provides the XML script to XML interpreter 423, where the XML script is executed.

Figure 7:
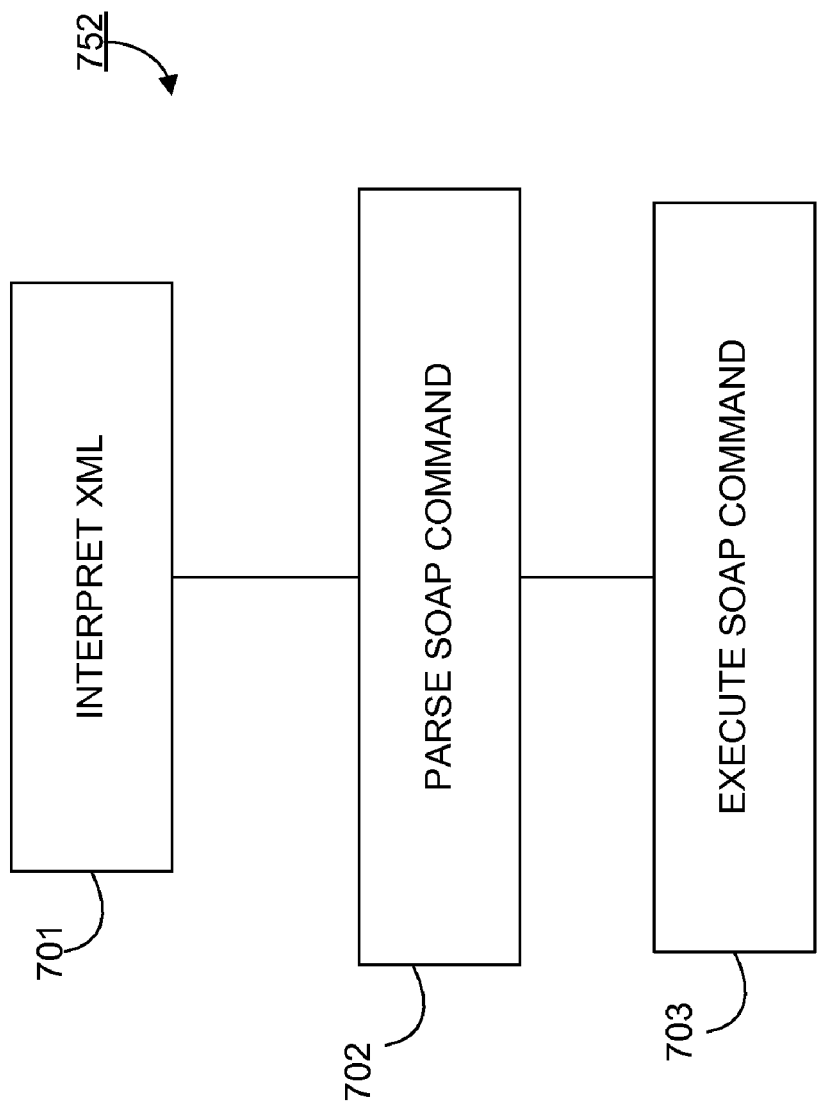
FIG. 7 is a flowchart showing a process by which the embedded controller executes the XML script.

Referring to FIG. 7, a process 752 is shown for executing the XML script in embedded controller 417. Process 752 is implemented by executable instructions in XML interpreter 423 and SOAP interpreter 426.

XML interpreter 423 interprets (701) the XML script to perform the functions contained therein. For example, if there are any conditional statements, control statements, or exception handlers defined by the XML script, XML interpreter performs those functions on the appropriate commands and variables contained in the XML script.

During processing, XML interpreter 423 parses (702) the XML script to identify any SOAP commands contained in the XML script. Identified SOAP commands are passed to SOAP interpreter 426, which executes (703) the SOAP commands. Results of the SOAP commands may be passed back to the XML interpreter 423 for further processing. Likewise, variables may be passed from the XML script to the SOAP commands.

Using XML script in this manner, embedded controller 417 is able to execute multiple SOAP commands in response to a single device-initiated query. Thus, device 411 can perform reconfiguration operations or the like using multiple SOAP commands without maintaining communication with an external device, such as server 419, during the reconfiguration process. The XML script can specify (future) times at which the SOAP commands are to be executed, thus providing the device with further control over its own operation. SOAP interpreter 426 implements the SOAP standard to interpret and execute function calls. As more devices and software systems have support for SOAP, device 11 will be able to execute a script that controls multiple devices by calling their SOAP services.

Architecture

Processes 640, 641, 550 and 752 are not limited to use with the hardware/software configuration of FIG. 4; they may find applicability in any computing or processing environment. Processes 640, 641, 550 and 752 may be implemented in hardware (e.g., an ASIC {Application-Specific Integrated Circuit} and/or an FPGA {Field Programmable Gate Array}), software, or a combination of hardware and software.

Processes 640, 641, 550 and 752 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 640, 641, 550 and 752.

Processes 640, 641, 550 and 752 may also be implemented as an article of manufacture, such as one or more machine-readable storage media (e.g., compact or floppy disc), each configured with a computer program, where, upon execution, instructions in the computer program cause a machine (e.g., a computer) to operate in accordance with one or more of processes 640, 641, 550 and 752.

The invention is not limited to use with the protocols and standards described above. For example, Web server may use Java Servlets, ASP (Active Server Pages), ISAPI (Internet Server Application Programming Interface), or .NET interfaces to communicate with application logic 432. The HTTP commands sent by embedded controller 417 and/or server 419 are not limited to HTTP GET and POST commands. Any commands and/or requests for requesting and receiving data may be used.

The invention is not limited to the protocols and architecture described with respect to FIG. 4. Similarly, the invention is not limited to device-initiated transfers of the XML script. For example, computer 433 may transmit the XML script directly to embedded controller 417 (rather than by way of server 419) via e-mail, file transfer protocol (FTP), message queues, or any other type of data transfer mechanism. These other transfer protocols may also be used with device-initiated transfers. Server 419 may generate the XML script and transmit it directly to controller 417. The XML script may be used on any machine, and is not limited to use with embedded controllers. RPCs other than SOAP calls may be scripted using XML and the resulting XML script may be processed in the manner described herein. SOAP commands other than those described herein may be used. The processes described herein may be implemented using circuitry such as programmable logic, logic gates, a processor, and/or a memory.

Other embodiments not described herein are also within the scope of the following claims.

APPENDIX A

Get Command

GET /Widget/config.xml HTTP/1.1
HOST: www.acme.com
Content-Type: text/xml
Content-length: nnn

```
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:www-acme-com:device:Widget:3</deviceType>
        <friendlyName>Widget</friendlyName>
        <manufacturer>Acme Industries</manufacturer>
        <modelName>Widget</modelName>
        <modelNumber>3</modelNumber>
        <serialNumber>53266D</serialNumber>
        <UDN>uuid:4A89EA70-73B4-11d4-80DF-0050DAB7BAC5</UDN>
    </device>
</root>
```

APPENDIX B

Post Command

```
POST /CONTROL HTTP/1.1
Host: www.acme.com
Content-Type: text/xml
Content-length: nnn
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:www-acme-com:device:Widget:3</deviceType>
        <friendlyName>Widget</friendlyName>
        <manufacturer>Acme Industries</manufacturer>
        <modelName>Widget</modelName>
        <modelNumber>3</modelNumber>
        <serialNumber>53266D</serialNumber>
        <UDN>uuid:4A89EA70-73B4-11d4-80DF-0050DAB7BAC5</UDN>
    </device>
</root>
<parameters>
    <Airflow xsd:type="integer">378</Airflow>
    <Humidity xsd:type="double">46.7</Humidity>
    <Motor xsd:type="integer">1500</Motor>
    <Vent xsd:type="integer">4</Vent>
</parameters>
```

And the response containing parameters that have been modified:

```
HTTP/1.1 200 OK
Connection: close
Content-Type: text/xml
Content-length: nnn
Date: Fri, 13 Jun. 2000 13:43:05 GMT
<?xml version="1.0"?>
<parameters>
    <Motor xsd:type="integer">1250</ Motor >
    <Vent xsd:type="integer">2</Vent>
</parameters>
```

What is claimed is:

1. A method performed by a controller associated with an instance of a device for retrieving data from a server, comprising:

polling the server by sending a message to the server periodically, the message containing information that distinguishes the instance of the device from all other instances of the device for which the server stores data, the information comprising non-address information; and receiving, from the server and in response to the message, data that is specific to the instance of the device, the data that is specific to the instance of the device comprising eXtensible Markup Language (XML) script containing plural Simple Object Access Protocol (SOAP) commands, the XML script defining a process to be executed by the controller, the process defining timing and sequence of execution of the plural SOAP commands and handling passage of variables among the plural SOAP commands.

2. The method of claim 1, wherein the message includes an operational parameter for the device and the data that is specific to the instance of the device comprises an updated value for the operational parameter.

3. The method of claim 2, wherein the message includes plural operational parameters for the device and the data that is specific to the instance of the device comprises updated values that differ from current values of the operational parameters.

4. The method of claim 1, wherein the data that is specific to the instance of the device comprises a configuration file for the device.

5. The method of claim 1, wherein the message identifies the instance of the device by a device type and/or one or more of a serial number and a universal unique identifier.

6. The method of claim 1, wherein the data that is specific to the instance of the device is received at the device via the Hypertext Transfer Protocol.

7. The method of claim 1, wherein the message includes a first operational parameter for the device and the data that is specific to the instance of the device includes a second operational parameter that is unrelated to the first operational parameter.

8. The method of claim 1, wherein:
the data that is specific to the instance of the device is encrypted; and
the method further comprises decrypting the data that is specific to the instance of the device.

9. The method of claim 1, wherein:
the data that is specific to the instance of the device contains a digital signature; and
the method further comprises authenticating the digital signature.

10. A system comprising:
a controller associated with an instance of a device, the controller being capable of communicating over a computer network; and
a server that is capable of communicating over the computer network;
wherein the controller is configured to send a message to the server over the computer network that identifies the instance of the device, the message containing information that distinguishes the instance of the device from all other instances of the device for which the server stores data, the information comprising non-address information; and
wherein the server is configured to (i) identify the instance of the device based on the message, (ii) retrieve data that is specific to the instance of the device, the data that is specific to the instance of the device comprising eXtensible Markup Language (XML) script containing plural Simple Object Access Protocol (SOAP) commands, the XML script defining a process to be executed by the controller, the process defining timing and sequence of execution of the plural SOAP commands and handling passage of variables among the plural SOAP commands, and (iii) send the data that is specific to the instance of the device to the controller over the computer network.

11. The system of claim 10, wherein the controller is not remotely-addressable from the computer network.

12. The system of claim 10, wherein the computer network comprises the Internet.

13. One or more non-transitory machine-readable media storing a computer program, the computer program being executable by a controller associated with a device to retrieve data from a server, the computer program comprising instructions that cause the controller to:
poll the server by sending a message to the server periodically, the message containing information that distinguishes the instance of the device from all other instances of the device for which the server stores data, the information comprising non-address information; and
receive, from the server and in response to the message, data that is specific to the instance of the device, the data that is specific to the instance of the device comprising eXtensible Markup Language (XML) script containing plural Simple Object Access Protocol (SOAP) commands, the XML script defining a process to be executed by the controller, the process defining timing and sequence of execution of the plural SOAP commands and handling passage of variables among the plural SOAP commands.

14. The one or more non-transitory machine-readable media of claim 13, wherein the message includes an operational parameter for the device and the data that is specific to the instance of the device comprises an updated value for the operational parameter.

15. The one or more non-transitory machine-readable media of claim 14, wherein the message includes plural operational parameters for the device and the data that is specific to the instance of the device comprises updated values that differ from current values of the operational parameters.

16. The one or more non-transitory machine-readable media of claim 13, wherein the data that is specific to the instance of the device comprises a configuration file for the device.

17. The one or more non-transitory machine-readable media of claim 13, wherein the message identifies the instance of the device by a device type and/or one or more of a serial number and a universal unique identifier.

18. The one or more non-transitory machine-readable media of claim 13, wherein the data is received at the device via the Hypertext Transfer Protocol.

19. The one or more non-transitory machine-readable media of claim 13, wherein the message includes a first operational parameter for the device and the data includes a second operational parameter that is unrelated to the first operational parameter.

20. The one or more non-transitory machine-readable media of claim 13, wherein:
the data that is specific to the instance of the device is encrypted; and
the computer program further comprises instructions that cause the controller to decrypt the data that is specific to the instance of the device.

21. The one or more non-transitory machine-readable media of claim 13, wherein:
the data that is specific to the instance of the device contains a digital signature; and
the computer program further comprises instructions that cause the controller to authenticate the digital signature.

22. An apparatus, associated with an instance of a device, for retrieving data from a server, comprising:
memory which stores executable instructions; and
a controller which executes the instructions to:
poll the server by sending a message to the server periodically, the message containing information that distinguishes the instance of the device from all other instances of the device for which the server stores data, the information comprising non-address information; and
receive, from the server and in response to the message, data that is specific to the instance of the device, the data that is specific to the instance of the device comprising eXtensible Markup Language (XML) script containing plural Simple Object Access Protocol (SOAP) commands, the XML script defining a process to be executed by the controller, the process defining timing and sequence of execution of the plural SOAP commands and handling passage of variables among the plural SOAP commands.

23. The apparatus of claim 22, wherein the message includes an operational parameter for the device and the data that is specific to the instance of the device comprises an updated value for the operational parameter.

24. The apparatus of claim 23, wherein the message includes plural operational parameters for the device and the data that is specific to the instance of the device comprises updated values that differ from current values of the operational parameters.

25. The apparatus of claim 22, wherein the data that is specific to the instance of the device comprises a configuration file for the device.

26. The apparatus of claim 22, wherein the message identifies the instance of the device by a device type and/or one or more of a serial number and a universal unique identifier.

27. The apparatus of claim 22, wherein the data is received at the apparatus via the Hypertext Transfer Protocol.

28. The apparatus of claim 22, wherein the message includes a first operational parameter for the device and the data that is specific to the instance of the device includes a second operational parameter that is unrelated to the first operational parameter.

29. The apparatus of claim 22, wherein:
the data that is specific to the instance of the device is encrypted; and
the controller executes instructions to decrypt the data that is specific to the instance of the device.

30. The apparatus of claim 22, wherein:
the data that is specific to the instance of the device contains a digital signature; and
the controller executes instructions to authenticate the digital signature.

* * * * *